(12) United States Patent
Fehrenbach et al.

(10) Patent No.: US 11,637,681 B2
(45) Date of Patent: Apr. 25, 2023

(54) FAST ACK/NACK IN WIRELESS COMMUNICATION NETWORKS

(71) Applicant: KONINKLIJKE PHILIPS N.V., Eindhoven (NL)

(72) Inventors: Thomas Fehrenbach, Berlin (DE); Thomas Wirth, Berlin (DE); Cornelius Hellge, Berlin (DE); Baris Goektepe, Berlin (DE); Lars Thiele, Berlin (DE)

(73) Assignee: Koninklijke Philips N.V., Eindhoven (NL)

( * ) Notice: Subject to any disclaimer, the term of this patent is extended or adjusted under 35 U.S.C. 154(b) by 285 days.

(21) Appl. No.: 16/388,406

(22) Filed: Apr. 18, 2019

(65) Prior Publication Data

US 2019/0245674 A1 Aug. 8, 2019

Related U.S. Application Data

(63) Continuation of application No. PCT/EP2017/076776, filed on Oct. 19, 2017.

(30) Foreign Application Priority Data

Oct. 24, 2016 (EP) ..................................... 16195299

(51) Int. Cl.
*H04L 5/14* (2006.01)
*H04L 5/00* (2006.01)
(Continued)

(52) U.S. Cl.
CPC .......... *H04L 5/1469* (2013.01); *H04L 1/1812* (2013.01); *H04L 1/1854* (2013.01); *H04L 1/1861* (2013.01); *H04L 5/0055* (2013.01)

(58) Field of Classification Search
None
See application file for complete search history.

(56) References Cited

U.S. PATENT DOCUMENTS

| 8,665,910 B2 | 3/2014 | Haustein et al. |
| 2009/0221231 A1* | 9/2009 | Weng ................. H04B 7/15585 455/15 |
| 2010/0027458 A1* | 2/2010 | Wu ...................... H04B 7/2606 370/315 |
| 2010/0215007 A1 | 8/2010 | Zhang et al. |

(Continued)

FOREIGN PATENT DOCUMENTS

| CN | 102237981 A | 11/2011 |
| CN | 102255718 A | 11/2011 |

(Continued)

OTHER PUBLICATIONS

3GPP TS 36.211, "3rd Generation Partnership Project; Technical Specification Group Radio Access Network; Evolved Universal Terrestrial Radio Access (E-UTRA); Physical channels and modulation (Release 13)", 650 Route des Lucioles—Sophia Antipolis Valbonne—France (Part 1 of 2), Mar. 2016, pp. 1-155.

(Continued)

*Primary Examiner* — Hassan Kizou
*Assistant Examiner* — Hector Reyes

(57) ABSTRACT

A receiver is configured to receive and process a radio signal. The radio signal includes a first frequency band including a first signal, the first signal including a plurality of TDD-frames. The receiver is configured to evaluate reception of downlink data to obtain evaluation data. The receiver is further configured to transmit the evaluation data in a second frequency band outside of the first frequency band.

25 Claims, 19 Drawing Sheets

(51) Int. Cl.
*H04L 1/1829* (2023.01)
*H04L 1/1812* (2023.01)

(56) References Cited

U.S. PATENT DOCUMENTS

| | | |
|---|---|---|
| 2012/0155337 A1 | 6/2012 | Park |
| 2012/0257554 A1 | 10/2012 | Kim et al. |
| 2014/0044092 A1 | 2/2014 | Guan et al. |
| 2014/0140251 A1 | 5/2014 | Pan et al. |
| 2014/0204811 A1 | 7/2014 | Lu et al. |
| 2016/0270070 A1* | 9/2016 | Mukkavilli ............ H04L 5/1469 |
| 2016/0329995 A1* | 11/2016 | Jiang .................... H04L 1/1861 |
| 2016/0338081 A1* | 11/2016 | Jiang ........................ H04L 1/00 |
| 2017/0202054 A1* | 7/2017 | Rathonyi .............. H04W 76/28 |
| 2017/0331670 A1* | 11/2017 | Parkvall ............... H04J 11/0079 |
| 2018/0042035 A1* | 2/2018 | Jiang .................... H04L 5/1469 |
| 2018/0070317 A1* | 3/2018 | Chen .................. H04W 72/042 |
| 2018/0097606 A1* | 4/2018 | Toledano .............. H04L 5/0055 |
| 2018/0367258 A1* | 12/2018 | Li .......................... H04L 1/1896 |
| 2018/0367285 A1* | 12/2018 | Yi ............................. H04L 1/18 |
| 2019/0239218 A1* | 8/2019 | Wang .................... H04L 1/1861 |

FOREIGN PATENT DOCUMENTS

| | | |
|---|---|---|
| CN | 102752085 A | 10/2012 |
| CN | 102938693 A | 2/2013 |
| EP | 2606697 A1 | 6/2013 |
| EP | 3054619 A1 | 8/2016 |
| EP | 3258628 A1 | 12/2017 |
| WO | 2010115295 A1 | 10/2010 |
| WO | 2012175030 A1 | 12/2012 |

OTHER PUBLICATIONS

3GPP TS 36.213, "3rd Generation Partnership Project; Technical Specification Group Radio Access Network; Evolved Universal Terrestrial Radio Access (E-UTRA); Physical layer procedures (Release 15)", 650 Route des Lucioles—Sophia Antipolis Valbonne—France (Part 2 of 2), Mar. 2019, pp. 353-355, 382-386.

Alcatel-Lucent, "Considerations of TDD NB-IoT", http://www.3gpp.org/ftp/tsg_ran/WG1_RL1/TSGR1_AH/LTE_NB-IoT_1601/Docs/, XP051064795, Jan. 18, 2016, pp. 1-4.

LTE TDD Overview, "HARQ Timing", https://www.sharetechnote.com/html/LTE_TDD_Overview.html#HARQ_Timing, pp. 1-8.

Ratasuk, Rapeepat et al., "NB-IoT system for M2M communication", 2016 IEEE Wireless Communications and Networking Conference, XP032959049, Apr. 3, 2016, pp. 1-5.

Thiele, Lars et al., "Multi-cell channel estimation using virtual pilots", Sprint 2008 IEEE Vehicular Technology Conference, 2008, pp. 1211-1215.

* cited by examiner

| Uplink-downlink configuration | Downlink to uplink switch periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Fig. 3b

| UL/DL Configuration | \ Subframe n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

Fig. 4

| Ng | N_DL_RB/8 (50 RBs) | Ng * N_DL_RB/8 | # of PHICH groups |
| --- | --- | --- | --- |
| 1/6 | 6.25 | 1.04 | 2 |
| 1/2 | 6.25 | 3.13 | 4 |
| 1 | 6.25 | 6.25 | 7 |
| 2 | 6.25 | 12.50 | 13 |

Fig. 6

| PUCCH Format | | UCI information |
|---|---|---|
| Format 1 | | Scheduling Request (SR) |
| Format 1a | | 1-bit HARQ ACK/NACK with/without SR |
| Format 1b | FDD (1CC) | 2-bit HARQ ACK/NACK with/without SR (This is for MIMO, 1 bit for each transport block) |
| | FDD (2CC) | 4-bit HARQ ACK/NACK with channel selection |
| | TDD (1CC) | 4-bit HARQ ACK/NACK |
| Format 2 | | CQI (20 coded bits) |
| Format 2 | | CQI and 1 or 2 bit HARQ ACK/NACK - 20 bits - Extended CP only |
| Format 2a | | CQI and 1 bit HARQ ACK/NACK - (20+1 coded bits) |
| Format 2b | | CQI and 2 bit HARQ ACK/NACK - (20+2 coded bits) |
| Format 3 | FDD (up to 5CC) | up to 10 bit HARQ ACK |
| | TDD (up to 5CC) | up to 20 bit HARQ ACK |
| Format 3 | FDD (up to 5CC) | 11 bit corresponding to 10 bit HARQ ACK and 1 bit positive/negative SR |
| | TDD (up to 5CC) | 21 bit corresponding to 20 bit HARQ ACK and 1 bit positive/negative SR |

Fig. 7

| PUCCH Format | | Number of Bits | UCI information |
|---|---|---|---|
| Format 1 | | | no ACK/NACK, SR only |
| Format 1a | | 1 | SISO ACK/NACK |
| Format 1b | FDD (1CC) | 2 | MIMO ACK/NACK |
| | FDD (2CC) | 4 | MIMO ACK/NACK |
| | TDD (1CC) | 4 | MIMO ACK/NACK |
| Format 2 | | 20 | CSI, no ACK/NACK |
| Format 2a | | 21 | CSI + SISO ACK/NACK |
| Format 2b | | 22 | CSI + MIMO ACK/NACK |
| Format 3 | FDD (up to 5CC) | 10 | ACK/NACK (up to 5CC) |
| | TDD (up to 5CC) | 20 | ACK/NACK (up to 5CC) |
| Format 3 | FDD (up to 5CC) | 11 | ACK/NACK (up to 5CC) + SR |
| | TDD (up to 5CC) | 21 | ACK/NACK (up to 5CC) + SR |

Fig. 8

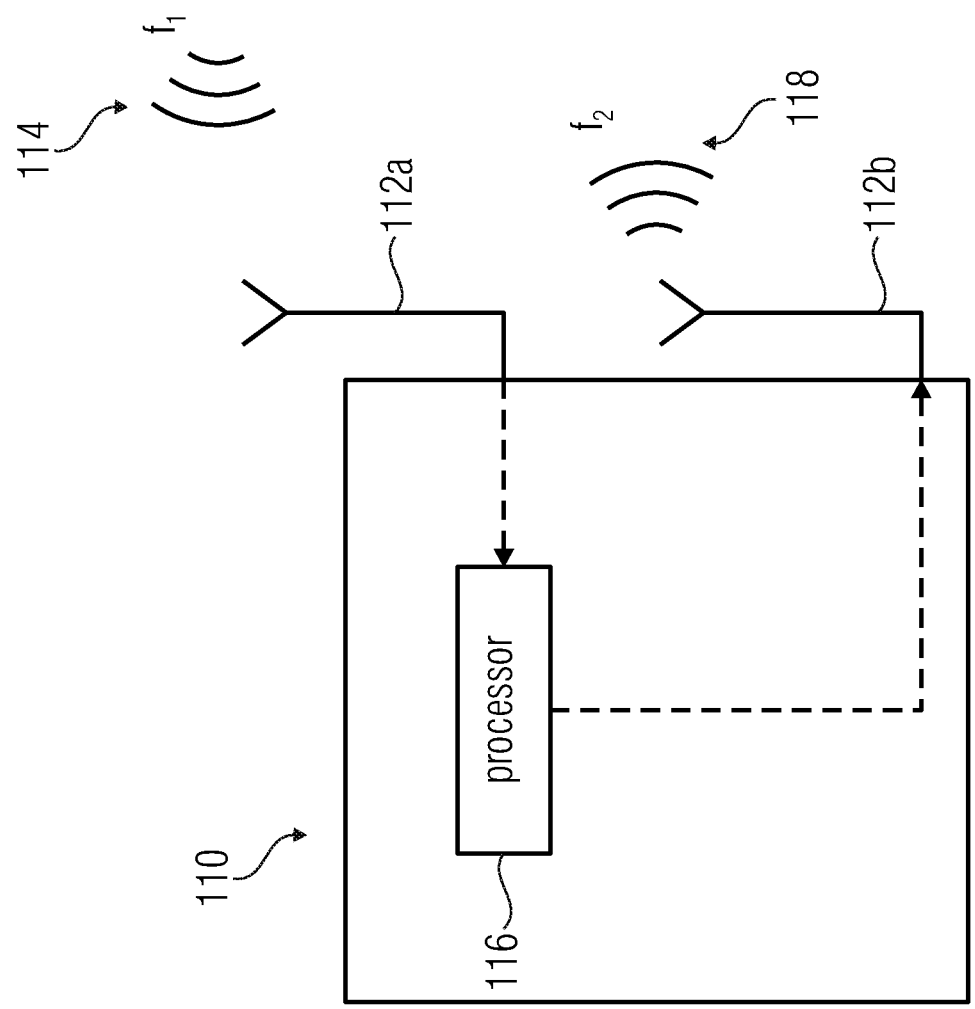

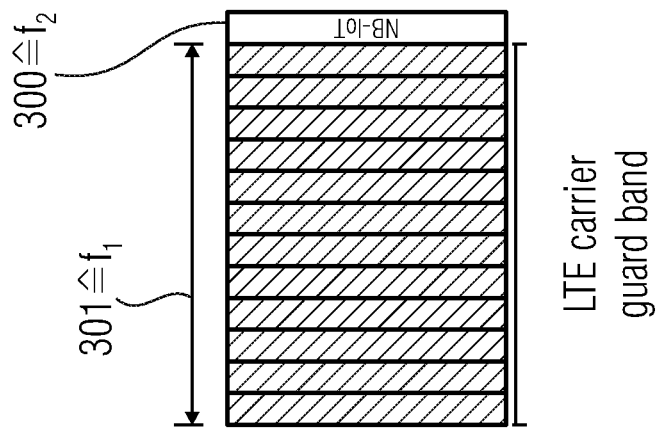
Fig. 11c LTE carrier guard band
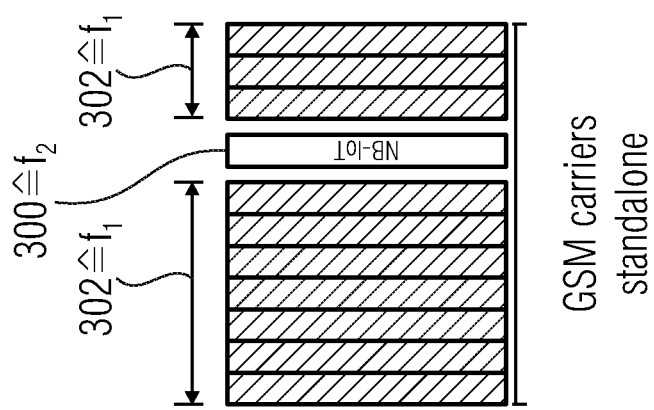
Fig. 11b GSM carriers standalone
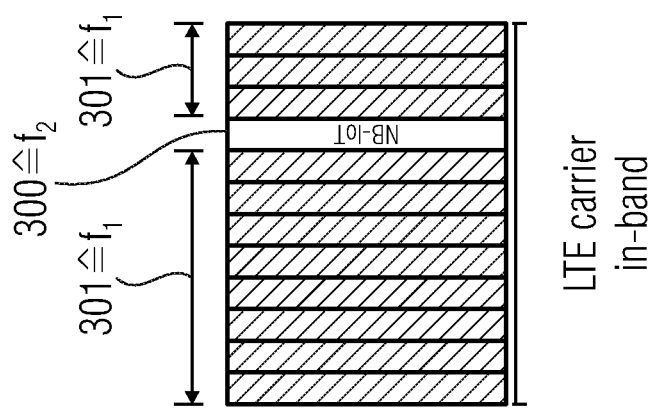
Fig. 11a LTE carrier in-band

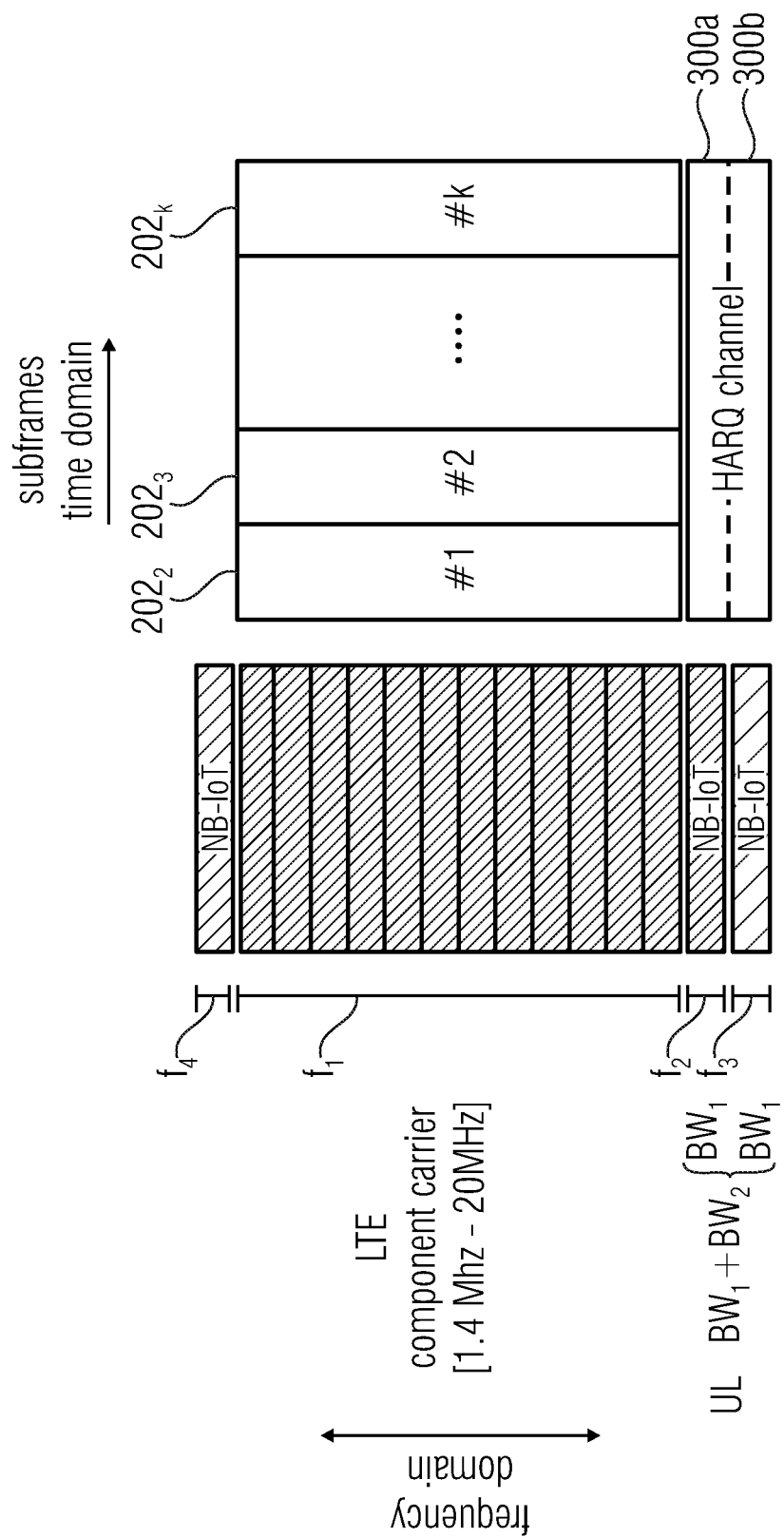

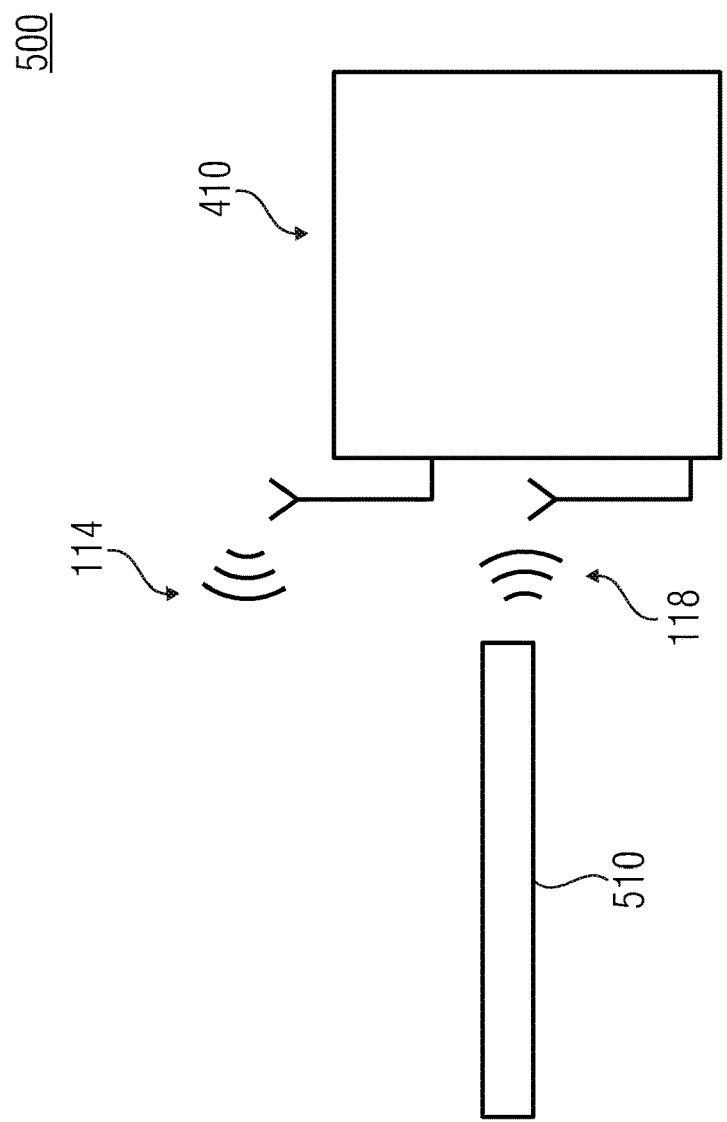
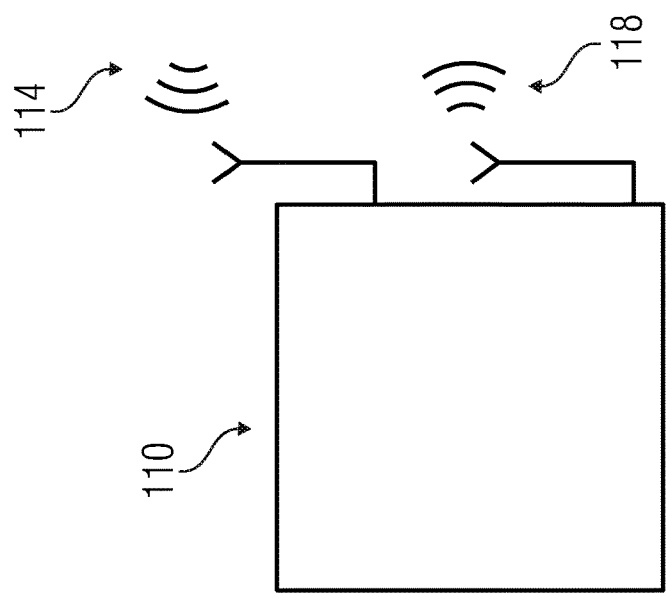
Fig. 15

```
MasterinformationBlock ::= SEQENCE {
    dl-Bandwidth ENUMERATED {
      n6, n15, n25, n50, n75, n100},
610 {  phich-Config PHICH-Config,
    systemFrameNumber BIT STRING (SIZE (8)),
    schedulingInfoSIB1-BR-r13 INTER (0..31),
    spare BIT STRING (SIZE (5))
}

PHICH-Config ::= SEQUENCE {
    phich-Duration ENUMERATED {normal, extended},
620 {  phich-Resource ENUMERATED {oneSixth, half, one, two}
    nb-phich-Config NB-PHICH-Config OPTIONAL, -- NEED ON
}

NB-PHICH-Config ::= SEQUENCE {
    phich-Duration ENUMERATED {normal, extended},
630 {  phich-Resource ENUMERATED {oneSixth, half, one, two}
    phich-Location ENUMERATED {c1, c2, ..., cN}
{
```

Fig. 16

FAST ACK/NACK IN WIRELESS COMMUNICATION NETWORKS

CROSS-REFERENCE TO RELATED APPLICATIONS

This application is a continuation of copending International Application No. PCT/EP2017/076776, filed Oct. 19, 2017, which is incorporated herein by reference in its entirety, and additionally claims priority from European Application No. EP 16195299.9, filed Oct. 24, 2016, which is also incorporated herein by reference in its entirety.

The present invention concerns the field of wireless communication networks or systems, more specifically wireless communication networks or systems to be accessed by time-division multiplexing. The invention further concerns narrowband HARQ. Embodiments concern receivers that allow for a fast retransmission of error-prone data.

BACKGROUND OF THE INVENTION

Mobile communication networks are used for transmitting and/or receiving data from or to wireless communication nodes such as user equipment and/or IoT devices. IoT devices may include physical devices, vehicles, buildings and other items having embedded therein electronics, software, sensors, actuators, or the like as well as network connectivity that enable these devices to collect and exchange data across an existing network infrastructure.

FIG. 1 is a schematic representation of an example of such a network infrastructure, like a wireless communication system including a plurality of base stations $eNB_1$ to $eNB_5$, each serving a specific area surrounding the base station schematically represented by the respective cells $100_1$ to $100_5$. The base stations are provided to serve users within a cell. A user may be a stationary device or a mobile device. Further, the wireless communication system may be accessed by IoT devices which connect to a base station or to a user. FIG. 1 shows an exemplary view of only five cells, however, the wireless communication system may include more such cells. FIG. 1 shows two users $UE_1$ and $UE_2$, also referred to as user equipment (UE), that are in cell $100_2$ and that are served by base station $eNB_2$. Another user $UE_3$ is shown in cell $100_4$ which is served by base station $eNB_4$. The arrows $102_1$, $102_2$ and $102_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $104_1$ and $104_2$ in cell $100_4$, which may be stationary or mobile devices. The IoT device $104_1$ accesses the wireless communication system via the base station $eNB_4$ to receive and transmit data as schematically represented by arrow $105_1$. The IoT device $104_2$ accesses the wireless communication system via the user $UE_3$ as is schematically represented by arrow $105_2$.

The wireless communication system may be any singletone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-SOFDM. Other waveforms, like non-orthogonal waveforms for multiple access, e.g. filterbank multicarrier (FBMC), may be used. Other multiplexing schemes like time-division multiplexing (time-division duplex—TDD) may be used.

An OFDMA system for data transmission may include an OFDMA-based physical resource grid which comprises plurality of physical resource blocks (PRBs) each defined by 12 subcarriers by 7 OFDM symbols and including a set of resource elements to which various physical channels and physical signals are mapped. A resource element is made up of one symbol in the time domain and one subcarrier in the frequency domain. For example, in accordance with the LTE standard a system bandwidth of 1.4 MHz includes 6 PRBs, and the 200 kHz bandwidth in accordance with the NB-IoT enhancement of the LTE Rel. 13 standard includes 1 PRB. In accordance with LTE and NB-IoT, the physical channels may include the physical downlink shared channel (PDSCH) including user specific data, also referred to as downlink payload data, the physical broadcast channel (PBCH) including for example the master information block (MIB) or the system information block (SIB), the physical downlink control channel (PDCCH) including for example the downlink control information (DCI), etc. The physical signals may comprise reference signals (RS), synchronization signals and the like. The LTE resource grid comprises a 10 ms frame in the time domain having a certain bandwidth in the frequency domain, e.g. 1.4 MHz. The frame has 10 subframes of 1 ms length, and each subframe includes two slots of 6 or 7 OFDM symbols depending on the cyclic prefix (CP) length.

FIG. 2 shows an exemplary LTE OFDMA-based subframe with two antenna ports for different selected Tx antenna ports. The subframe includes two resource blocks (RB) each made up of one slot of the subframe and 12 subcarriers in the frequency domain. The subcarriers in the frequency domain are shown as subcarrier 0 to subcarrier 11, and in the time domain, each slot includes 7 OFDM symbols, e.g. in the slot 0 OFDM symbols 0 to 6 and in slot 1 OFDM symbols 7 to 13. The white boxes 106 represent resource elements allocated to the PDSCH including the payload or user data, also referred to a payload region. The resource elements for the physical control channels (including non-payload or non-user data), also referred to as the control region, are represented by the hatched boxes 103. In accordance with examples, resource elements 103 may be allocated to the PDCCH, to the physical control format indicator channel (PCFICH), and to the physical hybrid ARQ indicator channel (PHICH). The cross-hatched boxes 107 represent resource elements which are allocated to the RS that may be used for the channel estimation. The black boxes 108 represent unused resources in the current antenna port that may correspond to RSs in another antenna port. The resource elements 103, 107, 108 allocated to the physical control channels and to the physical reference signals are not evenly distributed over time. More specifically, in slot 0 of the subframe the resource elements associated with the symbol 0 and the symbol 1 are allocated to the physical control channels or to the physical reference signals, no resource elements in the symbols 0 and 1 are allocated to payload data. The resource elements associated with symbol 4 in slot 0 as well as the resource elements associated with symbols 7 and 11 in slot 1 of the subframe are allocated in part to the physical control channels or to the physical reference signals. The white resource elements shown in FIG. 2 may include symbols associated with payload data or user data and in the slot 0 for symbols 2, 3, 5 and 6, all resource elements 106 may be allocated to payload data, while less resource elements 106 are allocated to payload data in symbol 4 of slot 0, and no resource element is allocated to payload data in symbols 0 and 1. In slot 1, the resource elements associated with symbols 8, 9, 10, 12 and 13 are all allocated to payload data, while for symbols 7 and 11 less resource elements are allocated to payload data.

Data blocks may be coded, transmitted, received and decoded. Data which has been split up into a plurality of blocks for block-wise transmission may be buffered for reception until all blocks are received by the receiver. One or more of those data blocks might be lost or might be received error-prone such that a retransmission of one or more data blocks may be needed. Such a retransmission may be initialized by the HARQ (Hybrid Automatic Repeat request) process.

Wherein in case of FDD (Frequency Division Duplex), it is pretty simple and obvious for user equipment to transmit HARQ ACK (Acknowledge) or NACK (not/negative Acknowledgement), as the UE starts preparing the response as soon as it completes the decoding PDSCH and transmits it 4 milliseconds (4 transmission time intervals—TTIs) later. But in TDD (Time Division Duplex), a UE cannot transmit the response in such a fixed timing as in FDD. It has to wait until it gets the next chance for the uplink (UL) transmission and the next chance will be different depending on UL/DL configuration (DL=downlink). Even when the UE gets the chance to transmit on the UL, it may not be possible for the particular UE to transmit all the response data. For example, if the UE gets too many DL subframes before the UL subframe, it will be difficult to transmit all the reply in the UL transmission because capacity or bandwidth of the physical uplink control channel (PUCCH) may not be large enough to accommodate or piggyback all the HARQ ACK/NACK. Thus, especially when using TDD (e.g. in LTE frame structure type 2), the HARQ process is only triggered after the next download. This takes at least 5 ms in current LTE. Additionally this increases the HARQ buffers as a large amount of data has to be stored until it can be successfully passed onto the higher layers.

FIG. 3a illustrates such a scenario in which an LTE system is running frame structure type 2 (FS2) which is TDD with configuration 3 in FIG. 3b. Knowing this, the ACK/NACK timing can be derived from FIG. 4, see configuration #1. In LTE a frame may comprise ten subframes $202_0$-$202_9$. In TDD all resource elements available for data transmission may be used for a specific purpose such as uplink or downlink data transfer or for special purpose such as subframe $202_1$ allowing for special signaling in the system and/or used as a guard time. With respect to the teachings disclosed herein, the special frames are considered as frames unusable for uplink-purpose or downlink-purpose, wherein downlink-subframes and uplink-subframes are usable by the transmitter and receiver. The example transmission illustrated in FIG. 3 comprises a transmission from a base station (evolved Node B—eNB) to an user equipment UE. Transmission in subframe 5, the subframe being referenced with $202_5$ is disturbed such that the user equipment is unable to successfully decode the data.

Disturbance may be understood as a lost package or a number of bit errors exceeding bit error correction ability of the used code.

During the following subframes $202_6$-$202_0$ the user equipment is unable to report the disturbed transmission. In subframe $202_1$ of the subsequent frame and following the downlink subframes, the user equipment is able to transmit a NACK message indicating the error-prone transmission. Two different mechanism to handle ACK messages in TDD are provided: multiplexing and bundling. Multiplexing implies that independent acknowledgements for several received transport blocks are fed back to the eNB. Bundling implies that the outcome of the decoding of downlink transport blocks from multiple downlink subframes can be combined into a single HARQ-ACK and transmitted in the uplink. The data received in subframe n will most likely be acknowledged in subframe n+4 at the earliest time.

Retransmission of the data is performed at the first following downlink subframe $202_5$ at the earliest.

FIG. 4 shows a table illustrating a timing of HARQ responses for different UL/DL configurations in LTE. The table illustrates in which subframes n a HARQ response is transmitted and to which PDSCH the response relates to. The number inserted into a field relating to a subframe indicates the number of preceding subframes to which the message relates. For example, in the case of UL/DL configuration 0 ACK/NACK messages are transmitted at subframes 2, 4, 7 and 9. At subframe 2, the table shows the value 6. This means that the UE transmits an ACK/NACK for PDSCH it received at 6 subframes earlier. Thus in subframe 2 only 2 subframes have been past in the current frame, but a frame comprises, for example, 10 subframes. Thus, 2+10 subframes have to be considered and 6 subframes earlier was the $6^{th}$ subframe of the previous frame (subframe 2+10−6 subframes=subframe 6). At subframe 4, the value 4 indicates that UE transmits ACK/NACK for PDSCH it received at subframe 0 in the current frame (subframe 4−4 subframes). At subframe 7, the user equipment transmits ACK/NACK for PDSCH it received at subframe 1 in the current frame (subframe 7−6 subframes). At subframe 9, the user equipment transmits ACK/NACK for PDSCH it received at subframe 5 (subframe 9-4 subframes) in the current frame. Simplified, this means that a HARQ response can be sent at the earliest in the next UL subframe, sometimes later.

Another way to transmit acknowledges is the physical HARQ indicator channel (PHICH) in the downlink which carries hybrid ARQ (HARQ) acknowledgements (ACK/NACK) for uplink data transfers. PHICHs are located in the first OFDM symbol of each subframe. The following explanation is given for the scenario on using FDD frame structure and the normal PHICH duration according to LTE. A PHICH may be carried by several Resource Element Groups (REGs). Multiple PHICHs can share the same set of REGs and are differentiated by orthogonal covers. PHICHs which share the same resources are called a PHICH group. Consequently, a specific PHICH is identified by two parameters: the PHICH group number and the orthogonal sequence index within the group.

For determining how many REGs a PHICH needs, the following information may be taken into account. The channel coding for HARQ ACK/NACKs is straightforward: an ACK is represented by three bits "111", and a NACK is represented by 3 bits "000" (3 bits each). PHICHs use binary phase-shift keying (BPSK) modulation, so 3 modulation symbols are generated for each ACK or NACK. Next, these 3 modulation symbols are multiplied to the orthogonal cover, which has the spreading factor (SF) of 4 for the normal cyclic prefix, resulting in a total of 12 symbols. Each REG contains 4 resource elements REs and each RE can carry 1 modulation symbol, so 3 REGs are needed for a single PHICH.

FIG. 5 illustrates an example of how PHICHs may be mapped to resources, wherein three PHICH groups are shown. The 3 REGs that support a PHICH group are evenly distributed within the system bandwidth to provide frequency diversity. The Physical Control Format Indicator Channel (PCFICH) also appears in the first symbol of each subframe and occupies 4 REGs regardless of the system bandwidth. These 4 REGs are evenly distributed across the system bandwidth.

A number of PHICHs that a PHICH group may include may be determined in a way that a total of 8 orthogonal sequences have been defined in 3GPP TS 36.211 table 6.9.1-2, so each PHICH group can carry up to 8 PHICHs.

$$N_{PHICH}^{group} = \lceil Ng(N_{RB}^{DL}/8) \rceil \quad \text{for normal } CP$$

$$N_{PHICH}^{group} = 2 \times \lceil Ng(N_{RB}^{DL}/8) \rceil \quad \text{for extended } CP, \text{wherein}$$

$$Ng \in \left\{\frac{1}{6}; \frac{1}{2}; 1; 2\right\} \quad \text{signaled in } MIB$$

FIG. 6 illustrates a number of PHICH groups with 10 MHz channel bandwidth dependent from the parameter Ng for normal cyclic prefixes according to the formula above. A number of PHICH groups that are supported in a system depends on the specific configuration. The actual number of PCFICH groups can be derived from the downlink bandwidth and the parameter Ng, both of which are broadcast in the MIB. The formula is defined in 3GPP TS 36.211 section 6.9 as shown above. Assume that the downlink channel bandwidth is 10 MHz and that Ng=1. In this case, there will be a total of 7 PCFICH groups available. The total number of PCFICHs supported per subframe would then be 7 PCFICH groups×8 PHICHs per PHICH group=56 PCFICHs. The total number of resource elements REs needed is 7 PHICH groups×3 REGs or PHICH group×4 REs per REG=84 REs.

Each PCFICH may carry HARQ/NACKs for uplink data transfers. A UE knows where to look for its PHICH as in the time domain, if the uplink transmission occurs in subframe n, the corresponding PHICH will be in subframe n+4. In the frequency domain, it is indicated by the uplink resource allocation with DCI format 0, where the specific PHICH (PHICH group number, orthogonal sequence index within the group) is derived from the lowest PRB index in the first slot of the corresponding PUSCH transmission and the DMRs cyclic shift. This is defined in 3GPP TS 36.213, section 9.1.2.

The parameter Ng is included in the MIB and not included in the System Information Block (SIB) due to the reason that the UE needs to know where the PCFICH configuration at the very beginning of the system acquisition process, which is a "chicken-and-egg" problem. On one hand, the UE needs to decode PHICH to know where to find SIB on PDSCH. On the other hand, PDCCH and PHICH and PCFICH share the resources in the control region of a subframe and the set of the available resources for PDCCH depends on the PHICH configuration as PCFICH resources are fixed and known.

Another way for transmitting ACK/NACK is the physical uplink control channel carrying downlink data acknowledgements. The physical uplink control channel (PUCCH) carries a set of information called Uplink Control Information (UCI). This is similar to PUCCH which carries DCI (Downlink Control Information). Depending on what kind of information the UCI in PDCCH carries, PDCCH is classified into various formations. In 3GPP 36.213, section 10.1 UE procedure for determining physical uplink control channel assignment, the PUCCH format is summarized as follows:

HARQ-ACK using PUCCH format 1 a or 1 b
HARQ-ACK using PUCCH format 1 b with channel selection
Scheduling request (SR) using PUCCH format 1
HARQ-ACK and SR using PUCCH format 1a or 1b
CQI using PUCCH format 2
CQI and HARQ-ACK using PUCCH format
2a or 2b for normal cyclic prefix
2 for extended cyclic prefix FIG. 7 is a tabular describing the specification described above in 3GPP specification, wherein FIG. 8 is another tabular format of description of specification to illustrate the contents of ARQ and CSI. These tables show the type and length of uplink control information (UCI) messages sent over the physical uplink control channel (PUCCH) and can be seen as the types of information that will instead be sent over the narrowband control channel as described in herein. The PUCCH format will be adopted to the narrowband characteristic accordingly.

Thus, there is a need to enhance data exchange in mobile communication networks.

SUMMARY

An embodiment may have a receiver, wherein the receiver is configured to receive and process a radio signal, the radio signal including a first frequency band including a first signal, the first signal including a plurality of TDD-frames; wherein the receiver is configured to evaluate reception of downlink data to obtain evaluation data; wherein the receiver is configured to transmit the evaluation data in a second frequency band outside the first frequency band.

Another embodiment may have a receiver, wherein the receiver is configured to receive and process a radio signal, the radio signal including a first frequency band including a first signal, the first signal including a plurality of TDD-frames; wherein the receiver is configured to transmit data in a second frequency band outside the first frequency band during a downlink-only subframe of a TDD-frame of the plurality of TDD-frames.

Another embodiment may have a transmitter, wherein the transmitter is configured to receive and process a radio signal, the radio signal including a first frequency band including a first signal, the first signal including a plurality of TDD-frames; wherein the transmitter is configured to evaluate reception of downlink data to obtain evaluation data; wherein the transmitter is configured to transmit the evaluation data in a second frequency band outside the first frequency band.

According to another embodiment, a radio signal may have: evaluation data relating to an evaluation of a reception of data received during a TDD-frame of a first signal in a first frequency band, wherein the radio signal includes a second frequency band and is transmitted during a TDD-frame of the radio signal.

According to another embodiment, a wireless communication system may have: an inventive receiver or a receiver, wherein the receiver is configured to receive and process a radio signal, the radio signal including a first frequency band including a first signal, the first signal including a plurality of TDD-frames; wherein the receiver is configured to transmit data in a second frequency band outside the first frequency band during a downlink-only subframe of a TDD-frame of the plurality of TDD-frames; and a transmitter wherein the transmitter is configured to receive and process a radio signal, the radio signal including a first frequency band including a first signal, the first signal including a plurality of TDD-frames; wherein the transmitter is configured to evaluate reception of downlink data to obtain evaluation data; wherein the transmitter is configured to transmit the evaluation data in a second frequency band outside the first frequency band.

According to another embodiment, a method may have the steps of: receiving and processing a radio signal, the radio signal including a first frequency band including a first signal, the first signal including a plurality of TDD-frames; evaluating reception of downlink data to obtain evaluation data; transmitting the evaluation data in a second frequency band outside the first frequency band.

According to another embodiment, a method may have the steps of: receiving and processing a radio signal, the radio signal including a first frequency band including a first signal, the first signal including a plurality of TDD-frames; transmitting data in a second frequency band outside the first frequency band during a downlink-only subframe of a TDD-frame of the plurality of TDD-frames.

Another embodiment may have a non-transitory digital storage medium having a computer program stored thereon to perform a method, the method having the steps of: receiving and processing a radio signal, the radio signal including a first frequency band including a first signal, the first signal including a plurality of TDD-frames; evaluating reception of downlink data to obtain evaluation data; transmitting the evaluation data in a second frequency band outside the first frequency band, when said computer program is run by a computer.

Another embodiment may have a non-transitory digital storage medium having a computer program stored thereon to perform a method, the method having the steps of: receiving and processing a radio signal, the radio signal including a first frequency band including a first signal, the first signal including a plurality of TDD-frames; transmitting data in a second frequency band outside the first frequency band during a downlink-only subframe of a TDD-frame of the plurality of TDD-frames, when said computer program is run by a computer.

The inventors have found out that data such as evaluation data, but also user data or control information may be transmitted in a TDD scheme from a receiving node during reception or during downlink phases of the communication when using a communication channel being arranged in a second frequency band unused by the first frequency band used for the transmission of the download data. This allows for transmission by the receiving node even when no transmission is scheduled in the first frequency band in the TDD scheme.

According to an embodiment a receiver is provided, wherein the receiver is configured to receive and process a radio signal. The radio signal comprises a first frequency band including a first signal, the first signal comprising a plurality of TDD-frames. The receiver is configured to evaluate reception of a downlink data to obtain evaluation data. The receiver is further configured to transmit the evaluation data in a second frequency band outside of the first frequency band. This allows to transmit the evaluation data, for example indicating an ACK or NACK, to be transmitted previously to the earliest uplink frame scheduled to the receiver and thus to transmit the ACK and/or NACK with a low delay so as to inform the transmitter of the downlink data at an early stage of data processing.

According to embodiments each TDD-frame comprises a plurality of subframes. Those subframes may be defined as uplink-only subframe or as a downlink-only subframe. The receiver may be configured to transmit the evaluation data during a downlink subframe. For example, the receiver may be configured to transmit the evaluation data in an uplink subframe of an NB-IoT frame. The NB-IoT frame may be arranged in an LTE carrier (in-band) in a guard band of the LTE carrier or in a GSM carrier as well as any other frequency bands. This allows using a narrow bandwidth of the NB-IoT bandwidth to transmit this relatively small amount of information when compared to the amount of downlink data. Although comprising a narrow bandwidth a NB-IoT frame may comprise sufficient throughput and may usually be acquired by a low amount of IoT devices, thus providing unused bandwidth.

Further embodiments provide a receiver being configured to transmit the evaluation data in at least a first uplink channel and a second uplink channel, the first uplink channel and the second uplink channel each comprising a bandwidth being narrower when compared to a bandwidth of the first frequency band. The receiver may thus use a further uplink channel in combination with the second frequency band so as to increase uplink bandwidth which may allow for an at least statistically low delay when having the possibility to access at least two uplink channels. The receiver may be configured to aggregate the first and second uplink channel and may apply a common channel code to the first uplink channel and the second uplink channel so as to define a virtual channel comprising a higher bandwidth when compared to the second frequency band. For example, different NB-IoT frames being arranged in different frequency bands may be used.

Further embodiments provide a receiver being configured to determine a prediction value indicating a likelihood of error-free coding of the downlink data. This may allow determining the prediction value during processing of the received downlink data, i.e., before reception and/or processing of the downlink data is complete. The receiver may include a positive acknowledgement (ACK) into the evaluation data when the likelihood is above a threshold value and to include a negative acknowledgement (NACK) into the evaluation data when the likelihood is below the threshold value. Thus, evaluation data indicating successful reception, error-prone reception respectively may be formed before reception or decoding of the downlink data is completed. This allows the receiver to transmit the evaluation data indicating a successful decoding or indicating a requirement for retransmission before the transmitter of the downlink data has completed its actual attempt of transmitting data and thus allows for a low delay between transmission and ACK/NACK.

According to a further embodiment the receiver is configured to include further information into the evaluation data. The further information may be an information indicating an amount of additional redundancy for retransmission, the additional redundancy allowing for probably error-free reception of the downlink data in retransmission, information indicating one of a frequency, a time, a frame or a slot within a frame for retransmission, i.e., the receiver may include a location indicator which may be understood as a suggestion on retransmission resources for the transmitter, which may be based on perceived channel quality at the receiver. The receiver may alternatively or additionally include information relating to a channel quality determined by the receiver and/or information related to a code block of the downlink data, i.e., if a transmission block is derived of several code blocks in the communication scheme, the code block for retransmission may be indicated. Including such information into the evaluation data may allow for supporting the transmitter to find suitable parameters for retransmission which on the one hand allow for a presumably error-free transmission of the downlink data, a low amount of attempts for retransmission and to save resources during retransmission, for example, when avoiding usage of unneeded additional redundancy.

Further embodiments provide a receiver, wherein the receiver is configured to receive and process a radio signal, the radio signal comprising a first frequency band including a first signal, the first signal comprising a plurality of TDD-frames. The receiver is configured to transmit data in a second frequency band outside of the first frequency band during a downlink-only subframe of a TDD-frame of the plurality of TDD-frames. This may allow transmitting data in the second frequency band although the receiver is unable to currently transmit in the first frequency band due to the present downlink-only subframe. The data transmitted in the second frequency band may be, for example, user data, control data or evaluation data. This may allow the receiver to transmit data although it would have to wait for transmission in the TDD scheme and may thus allow for a short delay in data exchange.

Further embodiments provide a transmitter, wherein the transmitter is configured to receive and process a radio signal, the radio signal comprising a first frequency band including a first signal, the first signal comprising a plurality of TDD-frames. The transmitter is configured to evaluate reception of downlink data to obtain evaluation data. The transmitter is configured to transmit the evaluation data in a second frequency band outside of the first frequency band. The transmitter may be, for example, an eNB (evolved node B, i.e., a base station). By using the second frequency band, reception of data uploaded by another node of the communication networks, for example, a receiver according to the teachings disclosed herein, may be acknowledged.

Further embodiments provide a radio signal comprising evaluation data relating to an evaluation of a reception of data received during a TDD-frame of a first signal in a first frequency band. The radio signal comprises a second frequency band and is transmitted during a TDD-frame of a radio signal.

Further embodiments provide a wireless communication system comprising a receiver according to the teachings disclosed herein and a transmitter according to the teachings disclosed herein.

Further embodiments provide a method. The method comprises receiving and processing a radio signal, the radio signal comprising a first frequency band including a first signal, the first signal comprising a plurality of TDD-frames. The method comprises evaluating reception of downlink data to obtain evaluation data and transmitting the evaluation data in a second frequency band outside the first frequency band.

Further embodiments provide a method comprising receiving and processing a radio signal, the radio signal comprising a first frequency band including a first signal, the first signal comprising a plurality of TDD-frames. The method further comprises transmitting data in a second frequency band outside the first frequency band during a downlink-only subframe of a TDD-frame of the plurality of TDD-frames.

Further embodiments provide a non-transitory computer program product comprising a computer-readable medium storing instructions which, when executed on a computer, perform a method according to the teachings disclosed herein.

BRIEF DESCRIPTION OF THE DRAWINGS

Embodiments of the present invention will be detailed subsequently referring to the appended drawings, in which:

FIG. 3b is a schematic representation of possible uplink/downlink configurations in the scenario of FIG. 3a;

FIG. 4 is a schematic table illustrating a timing of HARQ responses for different UL/DL configurations in LTE;

FIG. 6 is a schematic representation of a number of PHICH groups with 10 MHz channel bandwidth;

FIG. 7 is a tabular describing parts of the specification described in 3GPP specification;

FIG. 8 is another tabular format of description of specification to illustrate the contents of ARQ and CSI;

FIG. 9 shows a schematic block diagram of a receiver according to an embodiment;

FIG. 11a shows the arrangement of an NB-IoT carrier in-band LTE according to an embodiment;

FIG. 11b shows the arrangement of an NB-IoT carrier in a stand-alone GSM operation mode according to an embodiment;

FIG. 11c shows the arrangement of an NB-IoT carrier in an LTE guard band according to an embodiment;

FIG. 12 illustrates a schematic diagram of a possible channel access which may be performed by the receiver according to an embodiment;

FIG. 15 illustrates a schematic diagram of a communications network according to an embodiment;

FIG. 16 illustrates a set of pseudo code which may be used for implementing embodiments described herein;

DETAILED DESCRIPTION OF THE INVENTION

Figure 1:
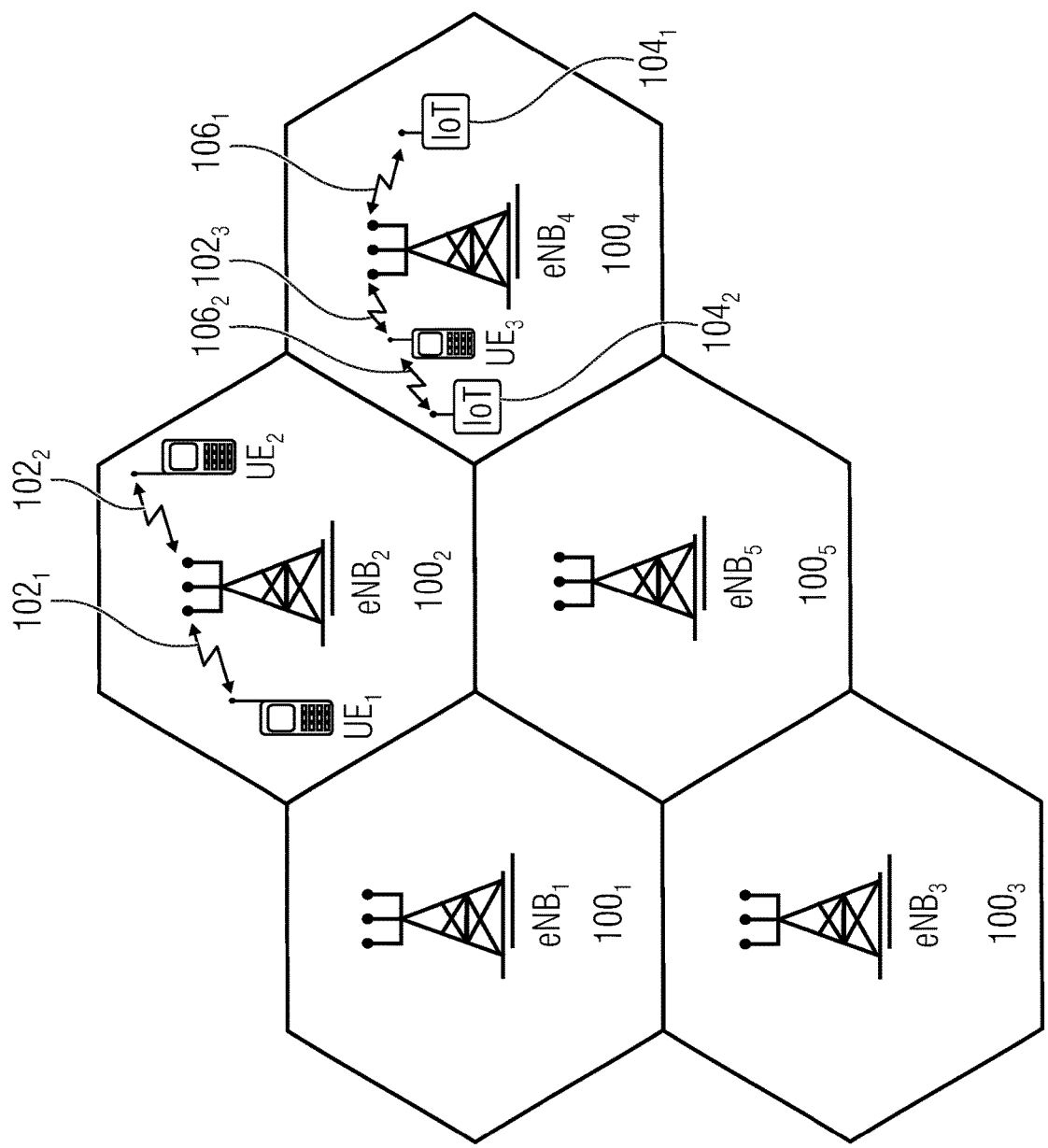
FIG. 1 is a schematic representation of an example of a network infrastructure.
Figure 2:
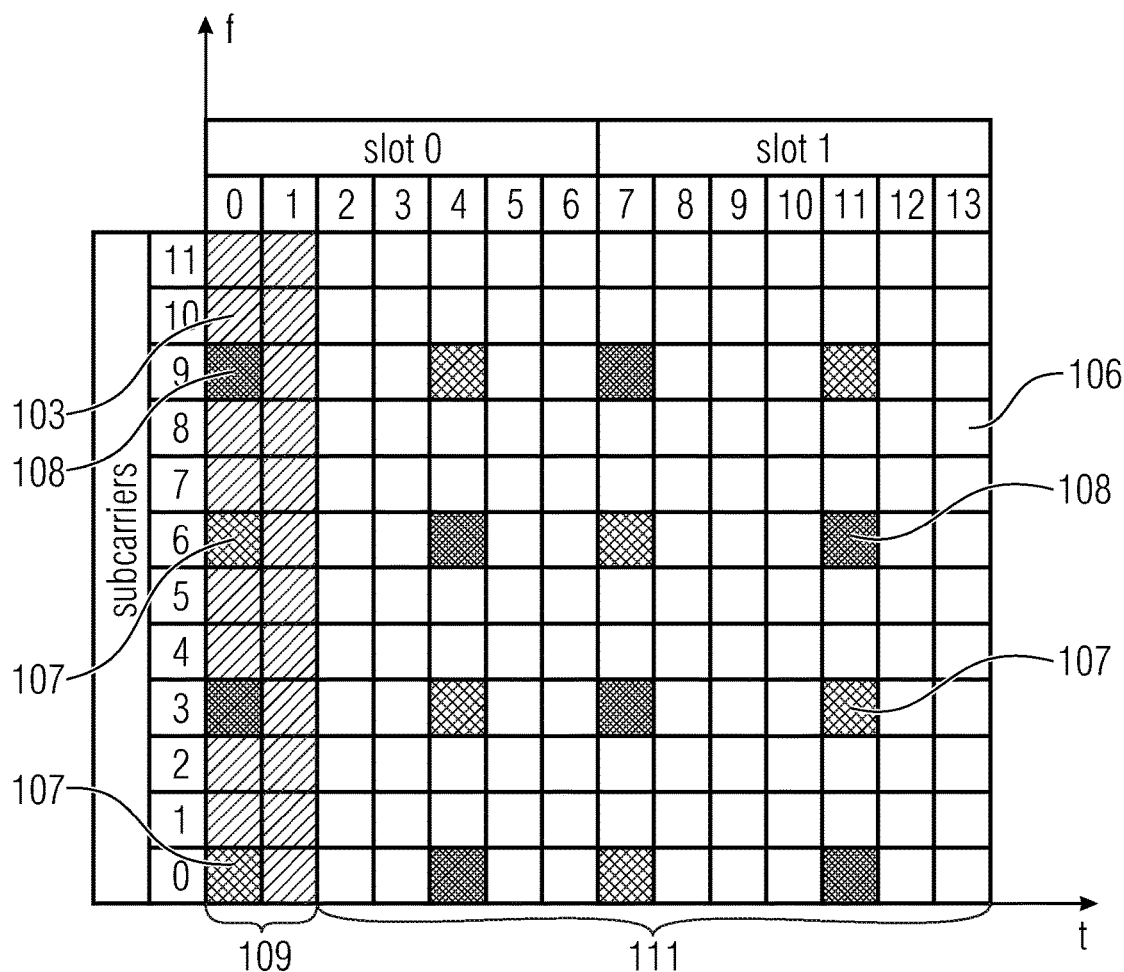
FIG. 2 is schematic representation of an exemplary LTE OFDMA-based subframe with two antenna ports for different selected Tx antenna ports.

In the following, embodiments of the present invention are described in further detail with reference to the enclosed drawings in which elements having the same or a similar function are referenced by the same reference signs.

Some embodiments described hereinafter relate to a receiver. Some embodiments relate to a transmitter. A receiver may be understood as a receiving node of a communications system that is scheduled to receive or at least to not transmit data during a downlink frame or a downlink subframe of a TDD scheme. A transmitter may be understood as a transmitting node of the communications system that is scheduled to transmit data during the downlink frame or subframe. In a different frame or subframe such as an uplink subframe, the receiver or a different receiver may be configured to transmit data, wherein the transmitter is configured to receive the data. Thus, the functionality described herein for receivers and for transmitters may be interchangeable according to a downlink or uplink frame or subframe. Downlink hereinafter relates to a transmission from a transmitter such as a base station to a receiver such as a UE, wherein uplink relates to a transmission from a receiver (related to the downlink phase) to the transmitter (related to the downlink phase).

FIG. 9 shows a schematic block diagram of a receiver 110. The receiver comprises an antenna 112a and is configured to receive and process a radio signal 114 with the antenna 112a. The radio signal 114 comprises a first frequency band $f_1$ including a first signal. The first signal may be mobile communications signal such as an LTE signal or a GSM signal. A bandwidth of the frequency band $f_1$ may be, for example, 1.4 MHz or more. The first signal comprises a plurality of TDD-frames. The receiver 110 is configured to evaluate reception of downlink data contained in the first signal so as to obtain evaluation data. The receiver may comprise a processor 116 for evaluating the reception of downlink data the processor 110.

The processor 116 may be configured to decode the first signal. During or after decoding of the first signal the processor 116 may determine a quality of the transmission of the downlink data. This may include, among other things, a number of bit errors, a phase-shift of the received signal and/or a signal-to-noise-ratio.

The receiver 110 is configured to obtain evaluation data, for example, it may generate evaluation data with the processor 116. The evaluation data may comprise, among other things, a feedback to the transmitter of the signal 114 indicating a successful or unsuccessful reception, for example, by including an ACK or a NACK message into the evaluation data, e.g. in a HARQ process.

The receiver is configured to access a second frequency band $f_2$ and to transmit messages on that second frequency band $f_2$ via a radio signal 118. The second frequency band $f_2$ may comprise a second signal. The second signal may comprise a plurality of TDD-frames. For example, some of the subframes of the TDD-frame may be uplink-only subframes or downlink-only subframes. According to other examples, the TDD-frames may be uplink-only or downlink-only. According to other examples, the second frequency band may be accessed via an FDD-scheme. The receiver may be configured to use the first frequency band $f_1$ which is used for a first mobile communication standard, wherein the second frequency band $f_2$ is used for a second mobile communication standard.

The receiver may access the second frequency band $f_2$ during a downlink frame or subframe of a TDD-frame is scheduled in the communication between the receiver 110 and a transmitter.

The receiver 116 is configured to transmit information such as the evaluation data in the second frequency band $f_2$. The second frequency band $f_2$ is arranged outside the first frequency band $f_1$. As will be described in connection with FIGS. 11a to 11c in more detail, the second frequency band $f_2$ being arranged outside the first frequency band $f_1$ may be understood as the frequency band $f_2$ being a frequency range or frequency band which is unoccupied by the signal 114 for transmission of the downlink data. Thus, the frequency band $f_2$ may be arranged at least partially out-of-band at a frequency band lower than a lowest frequency of the frequency band $f_1$, higher than a highest frequency of the frequency band $f_1$ and/or may be arranged in-band at a frequency region between a lowest frequency and a highest frequency of the frequency band $f_1$, i.e., the second frequency band being outside the first frequency band does not necessarily mean that the frequency band $f_2$ is separated from the frequency band $f_1$.

Although the receiver 110 is illustrated as comprising two antennas 112a and 112b, one for uplink and downlink, the receiver 110 may comprise a different number of antennas. For example, the receiver 110 may comprise only one antenna configured for transmission and reception. Alternatively, the receiver 110 may comprise a number of antennas being greater than 2, for example, for assessing different frequency bands with different antennas. The receiver may be, for example, a UE such as a mobile phone, a tablet computer or any other communication node.

Figure 10:
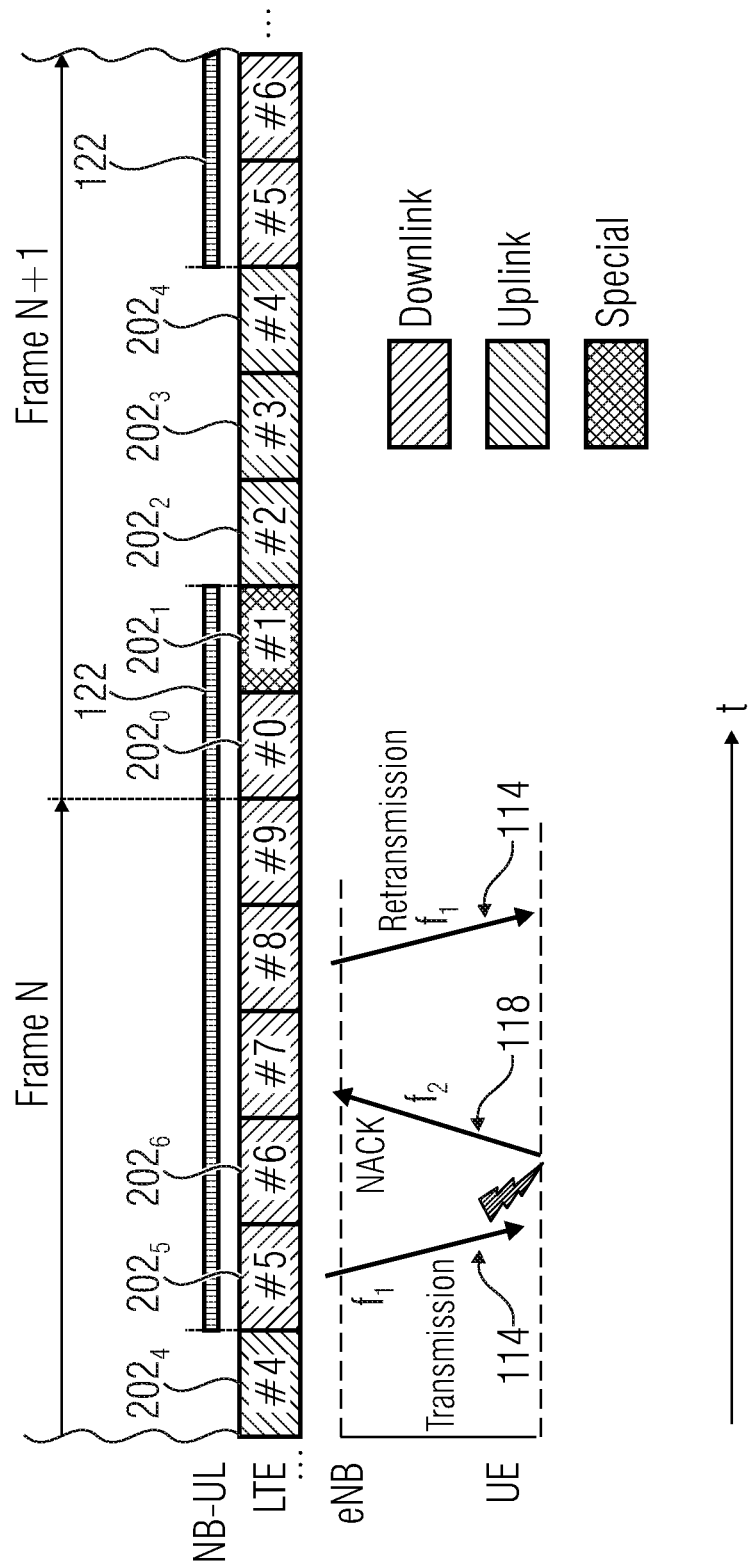
FIG. 10 shows a schematic diagram illustrating a possible timing when implementing a fast transmission of an ACK/NACK response according to an embodiment.

FIG. 10 shows a schematic diagram illustrating a possible timing when implementing a fast transmission of an ACK/NACK response. The scenario may be identical to the one explained in connection with FIG. 3, i.e., eNB transmits downlink data in subframe $202_5$ of frame N. The transmission is disturbed, i.e., error-prone such that retransmission is needed. As soon as the UE (receiver) evaluates the reception of the downlink data and detects that a retransmission is needed, it may transmit the evaluation data in the second frequency band $f_2$ using the signal 118. This may be, for example, during the frame $202_6$, which may be, for example, a downlink-only subframe in the frequency band $f_1$.

When using the second frequency band $f_2$ for transmitting the evaluation data a timing of transmission of the evaluation data may be different or even independent from a timing of the frames and/or subframes of the radio signal 114. As will be described later in more detail, the second frequency band $f_2$ may be used for a different communications protocol. for example, the second frequency band $f_2$ may be a GSM carrier, wherein the first frequency band $f_1$ may be an LTE frequency band. When accessing a GSM carrier for transmitting the evaluation data while receiving downlink data via an LTE carrier the signal 118 may be adapted to a GSM timing or the like, wherein the downlink data is received according to an LTE timing. After reception of the evaluation data by the eNB a retransmission of the downlink data may be performed by the transmitter. According to one scenario, this may be the next downlink frame following the reception of the evaluation data. Thus, although the receiver 110, the UE respectively may be trapped in a downlink-only phase of frame N and/or in a subframe which does not allow transmission of own messages like subframe $202_1$. The UE may transmit its response, i.e., the evaluation data and therefore may signalize the request for retransmission earlier when compared to the scenario of FIG. 3.

Bars 122 indicate times during which the UE is usually not provided with uplink capacity for data exchange in the frames N and/or N+1 are. Thus, during subframes indicated by the bars 122 a delay may be caused by waiting for uplink capacity and thus for retransmitting ACK and/or NACK in the first frequency band $f_1$. By using the second frequency band $f_2$, this delay may at least be reduced.

According to one example, the receiver 110 is configured to transmit the evaluation data in frequency band 1, for example, in uplink subframes $202_2$, $202_3$ and/or $202_4$, when such a frame is following a downlink frame or at least following a disturbed transmission with a low delay. For example, when the signal 114 is transmitted in downlink-only subframe $202_0$, the receiver 110 may be configured to transmit the evaluation data in uplink-only subframe $202_2$ using frequency band $f_1$ according to a regular network configuration. According to another example, receiver 110 may be configured to use frequency band $f_2$. According to another example, the receiver 110 may be configured to apply further decision parameters. For example, the receiver 110 may evaluate a probability of being allocated uplink resources in the next uplink frame. When it is unlikely to be allowed to transmit evaluation data in the next uplink subframe or when the receiver has to wait longer than a time threshold, then the receiver 110 may be configured to decide to use frequency band $f_2$. A time threshold may be any applicable value, for example, 1 subframe, 2 subframes or 3 subframes.

Figure 3A:
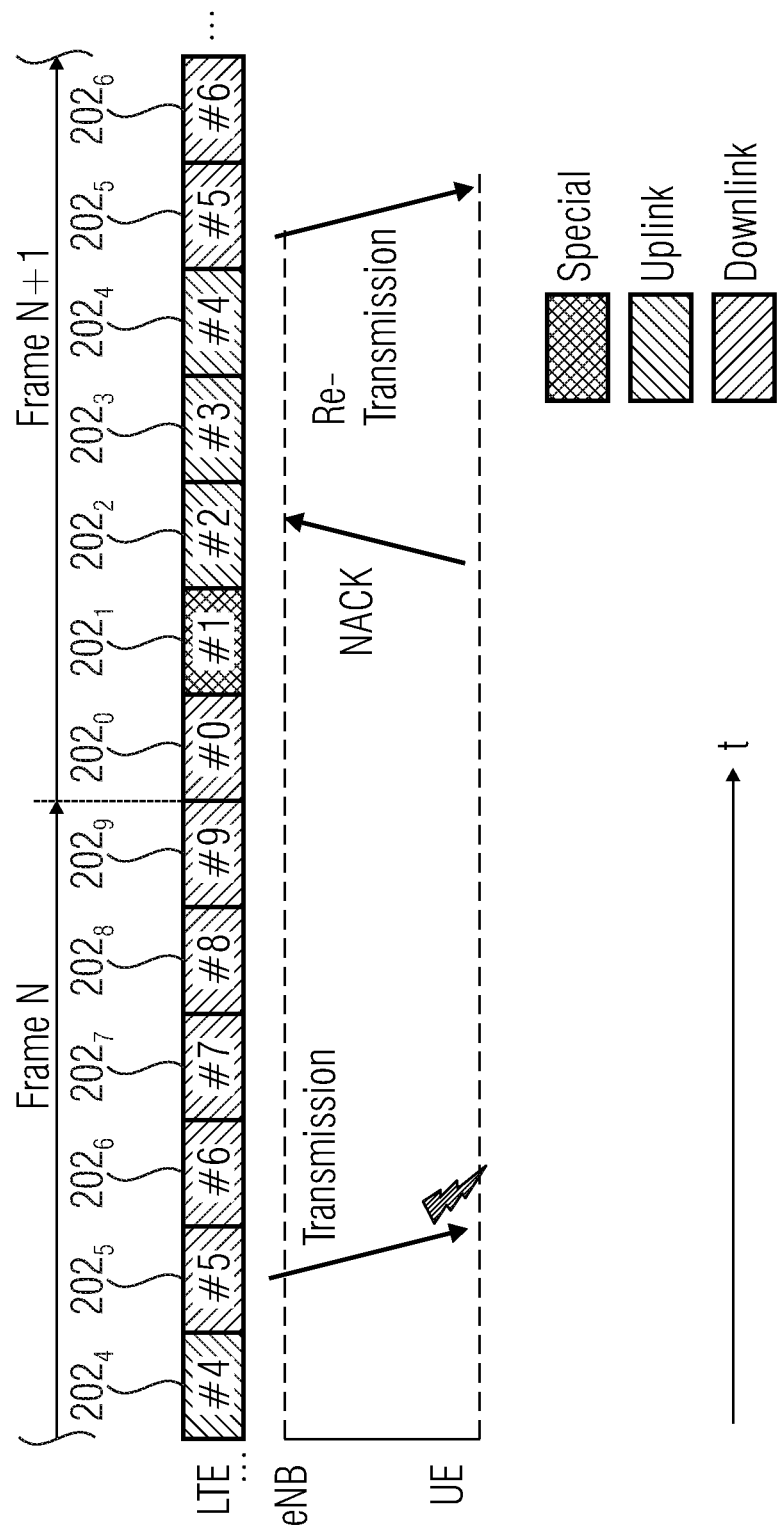
FIG. 3a is a schematic representation of a scenario in which an LTE a frame comprise TDD resources.
Figure 5:
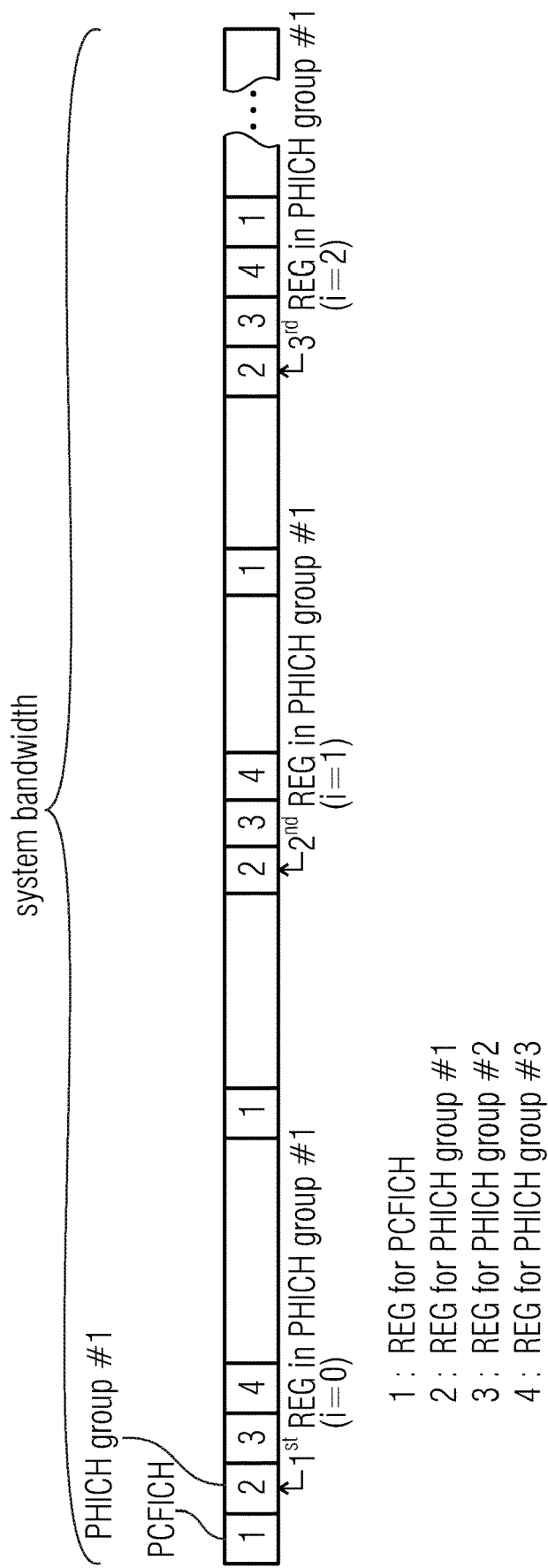
FIG. 5 is a schematic representation of an example of how PHICHs may be mapped to resources, wherein three PHICH groups are shown.

In other words, FIGS. 3 and 10 show a transmission of downlink data in subframe 5. When no narrow band (NB) channel is used for fast transmission of an ACK/NACK the response can be sent the earliest in the next uplink frame, i.e., frame $202_2$, as illustrated in FIG. 3. This can trigger a retransmission earliest in the next downlink subframe, i.e., subframe 5. When using a NB HARQ UL channel, i.e., the frequency band $f_2$, the ACK/NACK can be sent earlier or even immediately and a retransmission may also be triggered earlier, in this case in subframe 8. The NB-UL channel may be an NB-IoT channel, where some UL resources are reserved for LTE/5G PUCCH.

According to examples, the second frequency band $f_2$ is at least part of a frequency band designated for NB-IoT. Three operating modes for NB-IoT are now described with reference to FIGS. 11a to 11c, namely the in-band LTE operation mode (FIG. 11a), the stand-alone GSM operation mode (FIG. 11b) and the LTE guard band operation mode (FIG. 11c). FIGS. 11a to 11c are schematic representations of different operating modes in accordance with NB-IoT, also referred to as the NB-IoT. Thus, the receiver may be configured to operate in accordance with the LTE standard, whereas the second frequency band may comprise an NB-IoT channel.

FIG. 11a shows the in-band LTE operation mode in accordance with which a NB-IoT carrier or frequency band 300, also referred to as NB-IoT channel, is deployed within the LTE carrier of frequency band 301. The LTE frequency band 301 may correspond to the first frequency band $f_1$. The NB-IoT carrier of frequency band 300 may be used as second frequency band $f_2$.

FIG. 11b shows the stand-alone GSM operation mode placing the NB-IoT frequency band 300 among a plurality of GSM carriers 302. The NB-IoT frequency band 300 may be separated by a guard band from the GSM carriers. The GSM carriers 302 may be used as first frequency band $f_1$.

FIG. 11c shows the LTE guard band operation mode in accordance with which the NB-IoT carrier 300 is placed in one of the LTE guard bands provided at both ends of the carrier of the standard LTE.

Although FIGS. 11a to 11c illustrate the second frequency band $f_2$ being arranged inside or adjacent to a frequency interval between a minimum frequency and a maximum frequency of the frequency band $f_1$, the above-described and non-limiting scenarios are combinable with each other. The second frequency band $f_2$ may be any frequency band unused by the frequency band 301 or 302. For example, a receiver may receive the first signal in the first frequency band $f_1$ illustrated in FIG. 11a or 11c while using the second frequency range $f_2$ for transmitting the evaluation data as illustrated in FIG. 11b or vice versa. Alternatively or in addition, further or other frequency bands may be used for the first frequency band $f_1$ and/or the second frequency band $f_2$. In other words, in LTE REL. 13, NB-IoT channels in the LTE assistance can be either embedded in-band, or in the guard band of an existing LTE carrier. A basic narrowband (NB) carrier uses, for example, 200 kHz bandwidth or one Physical Resource Block (PRB)=12 subcarriers in frequency domain. Such an NB carrier may provide enough bandwidth for transmitting data such as the evaluation data comprising data relating to HARQ ACK or NACK. It is noted, that the second frequency band is not limited to utilization of NB-IoT carriers and/or that NB-IoT carriers may exist or may be defined with other properties than described herein without limiting the examples described herein to the present embodiments. When the receiver uses an NB-IoT frame for transmitting the evaluation data in the second frequency band, the receiver may be configured to transmit the evaluation data during an uplink subframe of an NB-IoT frame, i.e., the receiver may be configured to communicate according to the respective protocol used in the second frequency band.

FIG. 12 illustrates a schematic diagram of a possible channel access which may be performed by the receiver 110, for example. A plurality of subframes $202_2$ to $202_8$ are schematically presented. For illustration purpose only the subframes each comprise a downlink-only configuration including resources for signaling such as primary synchronization signals (PSS) and/or secondary synchronization signals (SSS). An example bandwidth of the first frequency band $f_1$ may be between 1.4 MHz and 20 MHz. The receiver may access the second frequency band $f_2$ comprising a bandwidth BM. As was described with reference to FIGS. 11a to 11c, the frequency band $f_2$ may be, for example, an NB-IoT carrier 300. Simplified, the receiver may use the bandwidth of the second frequency band $f_2$ of the NB-IoT carrier 300a. Additionally, the receiver may use a further frequency band $f_3$ comprising a further bandwidth $BW_2$ which may be, for example, a further NB-IoT carrier 302b. A receiver according to embodiments described herein may be configured to use two or even more than two frequency bands outside of the frequency band $f_1$ as ARQ/HARQ channel. Simplified, the receiver may use two or more NB-IoT carriers, i.e., a $2^{nd}$ a $3^{rd}$, . . . , an $n^{th}$ carrier probably aggregated channel in frequency domain. For example, the receiver may be configured to use a frequency band $f_4$ associated to an NB-IoT in Guard Band alternatively to frequency band $f_2$ and/or $f_3$ or in addition hereto.

For example, the receiver may decide to use one of the carriers 300a or 300b (or a different carrier) for transmitting the evaluation data, e.g., based on a workload of the respective channel. Alternatively, the receiver may be configured to use both carriers 300a and 300b at the same time, i.e., to combine the frequency bands $f_2$ and $f_3$. The frequency bands $f_2$ and $f_3$ may be adjacent to each other or may be separated from each other in the frequency domain. Thus, the second frequency band may also be a combination of several NB-IoT channels, e.g., a combination of two or more NB-IoT channels in the guard band, of two or more in-band NB-IoT channels and/or two or more guard band NB-IoT channels and/or a combination of different types of NB-IoT channels. A type of combination may differ between different receivers and may be influenced or may depend on the operating mode of the communication system. As was described with reference to FIG. 11a to FIG. 11c one or more NB-IoT channels may be located in other bands different from the first frequency band, such as GSM carriers. In other words, 1, 2, . . . , N_SC narrowband carriers may be used as separate ARQ/HARQ channel, wherein N_SC may be any value, e.g. less than 1,000, less than 500 or less than 100. Each carrier used may be in-band and/or in the guard-band of an existing LTE carrier and/or in other carriers. If a higher bandwidth when compared to one single narrowband carrier is needed, several NB bands may be aggregated. The robustness of this special HARQ band may be increased or may be high by using a channel code over the N aggregated HARQ channels. Note that N may be one, two or a higher number such as three, four, five or more.

In other words, the inner 1.4 MHz of the LTE band is reserved for mandatory LTE control channels such as synchronization signals (PSS/SSS) and broadcast information (PBCH). These frequency bands maybe cannot be used for NB-IoT subchannels. Also non-continuous NB-IoT could be bundled into a logical NB-IoT HARQ channel, e.g. the channels at frequency bands $f_2$ and $f_4$. Alternatively or in addition, the receiver may be configured to reuse this "HARQ Channel", i.e. at least one frequency band, as separate data channel for higher layers, e.g. transport layer. Since this channel has low capacity, small packets from a higher layer (which are not piggybacked) may be mapped onto this channel. This enables a faster transport of small packets. If more NB-IoT channels are aggregated, channel coding with interleaving across the aggregated bands will improve the robustness of transmission by better exploit frequency diversity and thus improve overall efficiency.

Thus, the receiver may be configured to transmit the evaluation data in at least a first uplink channel and a second uplink channel, the first uplink channel and the second uplink channel each comprising a bandwidth being narrower when compared to a bandwidth of the first frequency band. The receiver may be configured to aggregate the first uplink channel and the second uplink channel by applying a common channel code to the first uplink channel and to the second uplink channel, for example when utilizing adjacent frequency bands such as $f_2$ and $f_3$. This may allow for increasing capacity in this feedback channel and may increase robustness since coding and interleaving can be utilized over a wider bandwidth. Coding and interleaving may be executed by the receiver for adjacent and for separated channels such as $f_2$ and $f_4$ and/or $f_3$ and $f_4$. Alternatively, both channels could multiplex the same HARQ information, and the decoder on the receive side could perform HARQ channel selection, to increase robustness.

When referring again to FIG. 10, a possible configuration of the receiver 110 shall be explained. When receiving the transmitted download data with the signal 114, the processor may process and/or decode the received data portion by portion, for example, symbol-by-symbol, bit-by-bit or byte-by-byte or the like. Thus, although receiving a possibly large amount of data, this data is processed step-by-step. According to one example, the receiver buffers all data received and tries to decode it when reception is complete, wherein it may determine that decoding is not possible or the quality is below a threshold value. According to further embodiment, the receiver is configured to determine a prediction value indicating a likelihood of error-free decoding of the downlink data during this step-wise processing, i.e., before reception is complete. Error-free means a number of errors which is still be to be corrected by the receiver. This may also be referred to as online-evaluation. For example, based on parameters like phase-shifts and/or inclined signal edges, the receiver may determine that it is very likely that bit-errors will occur. The receiver may also evaluate or determine that an amount of bit-errors may be critical for error-free decoding or may determine that channel malfunctions are increasing during reception. Simplified, the receiver may monitor or determine if a packet received may be decoded correctly after reception but also during reception. During reception the receiver may determine a prediction on how likely the packet may be decoded when it is finally received. Thus, the receiver may determine a prediction value indicating a likelihood of error-free decoding of the downlink data. The receiver may include a positive acknowledgement into the evaluation data when the likelihood is above a threshold value and to include a negative acknowledgement into the evaluation data when the likelihood is below the threshold value. Thus, the receiver may transmit evaluation data based on a prediction relating to a successful reception. In other words, a predictive HARQ may be sent back to the transmitter.

When still referring to FIG. 10, the NACK may be sent during a time duration of the subframe $202_5$, when the receiver determines that it is likely to not decode the received data correctly. Thus, the receiver may be configured to transmit the evaluation data before processing of the received downlink data is complete. The likelihood threshold value may be of any suitable value, for example, at least 90%, at least 95% or at least 99% probability of successful decoding. Although being described as a likelihood value for successful decoding, embodiments shall not be limited thereto. It is also possible to determine a threshold value indicating a likelihood or probability of disturbed or unsuccessful decoding, wherein the processor may transmit a NACK-message in the evaluation data when the determined likelihood is above the threshold value. For example, the threshold value may be at most 10%, at most 5% or at most 1% probability of erroneous decoding. Further, it is not needed to directly determine the likelihood. Any other parameters such as a bit-error count or a phase-shift variation during reception may be used as indicating value and thus for determining, if a positive acknowledgement (ACK) or a negative acknowledgement (NACK) should be transmitted.

Independent from a time at which the receiver transmits the evaluation data, further information can be added to the HARQ. Further information can be, for example, a redundancy indicator indicating how much redundancy is missing or shall be spent by the transmitter to allow for a successful decoding. Alternatively or in addition, the evaluation data may comprise a location indicator which may be a suggestion on retransmission resources and may be based on a perceived channel quality at the receiver. Alternatively or in addition, a Channel Quality Indicator (CQI) may be included into or added to the evaluation data to assist retransmission scheduling at the transmitter. Thus, the receiver may indicate which channels may be suitable for retransmission. Alternatively or in addition, the evaluation data may further comprise a Code Block Indicator (CBI). If a transmission block is derived of several code blocks, the code block suggested for retransmission may be indicated. Alternatively or in addition, the receiver may be configured to predict a decoding probability if the additional redundancy was spent. The evaluation data may comprise information relating to this decoding probability.

Each of the aforementioned information may also be transmitted during reception or after reception of the retransmission. Beside the shorter delay between transmission and retransmission such information may allow for changing a coding of the data transmitted. This may allow for preventing unsuccessful decoding such that a retransmission may be unnecessary.

As alternative to or in addition to the evaluation data, the receiver 110 may be configured to transmit control data related to a resource allocation of the first signal in the first frequency $f_1$ band and/or to transmit user data. Simplified, the receiver may use the bandwidth of one or more narrow-band side channels to transmit the evaluation data and further information such as control data or user data. Control data may indicate a position of the evaluation data or other data in the second signal in the time domain and/or in the frequency domain. The receiver may also be configured to receive such a control data and to transmit the evaluation data or the data at the indicated position in the second signal. Thus, the control data may indicate a control over another communication partner or may comprise user data of the receiver. Control data of another communication partner may be, for example, be information indicating an amount of additional redundancy for retransmission, information indicating one of a frequency, a time, a frame or a slot within a frame for retransmission, information relating to a channel quality determined by the receiver, information related to a code block of the downlink data and/or a decoding probability for requested additional redundancy. In other words, when using a TDD system and other UL is probably unavailable, this channel may additionally be used for other control data for user data, e.g. to better support latency constrained traffic and to reuse additional latency or jitter coming from a blocked ACK or NACK.

The additional information may contain other control channels such as MIMO feedback information, for example, channel quality information (CQI) Channel state information (CSI), pre-coding matrix indicator (PMI) or rank indicator (RI) for a particular subband or group of subbands. This information may include incremental feedback information. In addition, this channel may carry user data as well.

The receiver 110 may be configured to include a scheduling request into the evaluation data. The scheduling request may relate to a request for uplink resources in a TDD-frame. For example, the TDD-frame may comprise a plurality of subframes, wherein a subframe of the plurality of subframes is an uplink-only subframe or a downlink-only subframe. The receiver may be configured to include, into the evaluation data, the scheduling request or the request for using an uplink-only subframe. This may allow achieving lower uplink transmission latency by indicating a scheduling request during TDD downlink transmission using the NB-side channel, i.e., the second frequency band $f_2$. This may bring significant gains in UL transmission latency in TDD systems.

Figure 13:
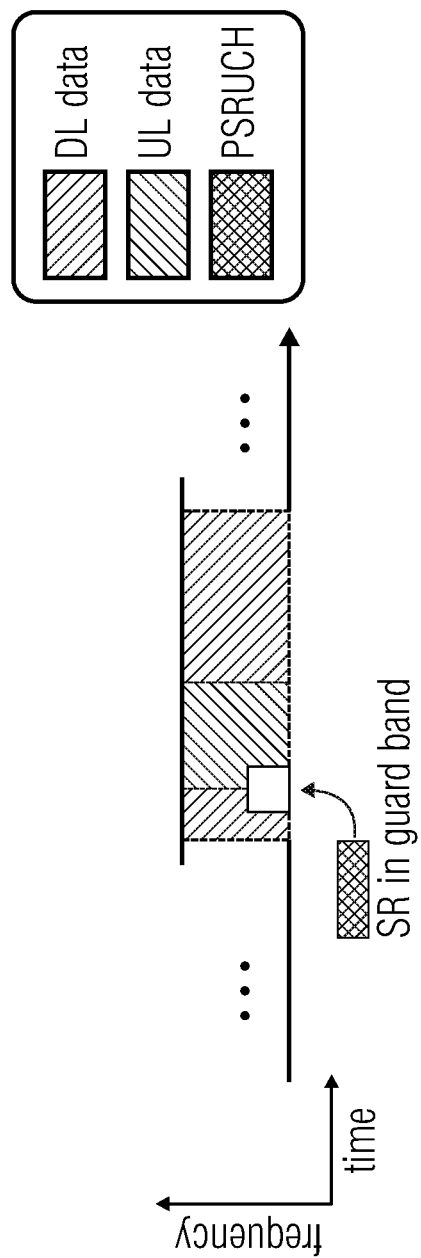
FIG. 13 is a schematic diagram of a timing of sequences modulated on the transmission in the NB-side channel, according to an embodiment.

As illustrated in FIG. 13, sequences may be modulated on the transmission in the NB-side channel. The receiver is configured to transmit the evaluation data, the scheduling request (SR) respectively, such that a user identification, i.e., an identification of the receiver is possible at the eNB side, for example, by inserting an identifier or the like. Additionally, buffer status or expected UL transmission size may be indicated by the receiver. As explained in connection with FIGS. 11a to 11c, the evaluation data may be transmitted, for example in a guard band of the LTE carrier and/or in a physical scheduling request uplink channel (PSRUCH).

Alternatively or in addition, the second frequency band $f_2$ may be used for other data than evaluation data such as a physical upload control channel (PUCCH). Based on the low bandwidth it is referred to hereinafter as NB PUCCH channel. The position of the NB PUCCH channel may be signaled by the receiver. This may be done at the user equipment (receiver), e.g., over RRC or as part of the system information. Users may be implicitly assigned resources depending on the resource assignment they should report on. Alternatively or in addition, users may receive a PUCCH slot as part of the DCI. For semi-persistent scheduling (SPS) a longer term assignment may be set. Alternatively, users may be multiplexed using codes such as Gold, DFT, Hadamard or the like. The codes may be spread among the time and/or frequency resources. Both sides have to agree on which codes and sequence should be used on a transmitter and receiver side.

Each of the aforementioned data to be transmitted from the receiver to the transmitter (or other nodes) may be implemented independently from each other and may be combined with each other in an arbitrary way. The receiver 110 may be configured to receive and process a radio signal, the radio signal comprising a first frequency band including a first signal, the first signal comprising a plurality of TDD-frames. The receiver is configured to transmit data in the second frequency band outside of the first frequency band during a downlink-only subframe of a TDD-frame of the plurality of TDD-frames. The data transmitted in the second frequency band may be the ACK/NACK evaluation data, control data and/or user data including the scheduling requests and/or signaling data, for example, relating to the position of the PUCCH channel and/or a combination thereof.

Figure 14:
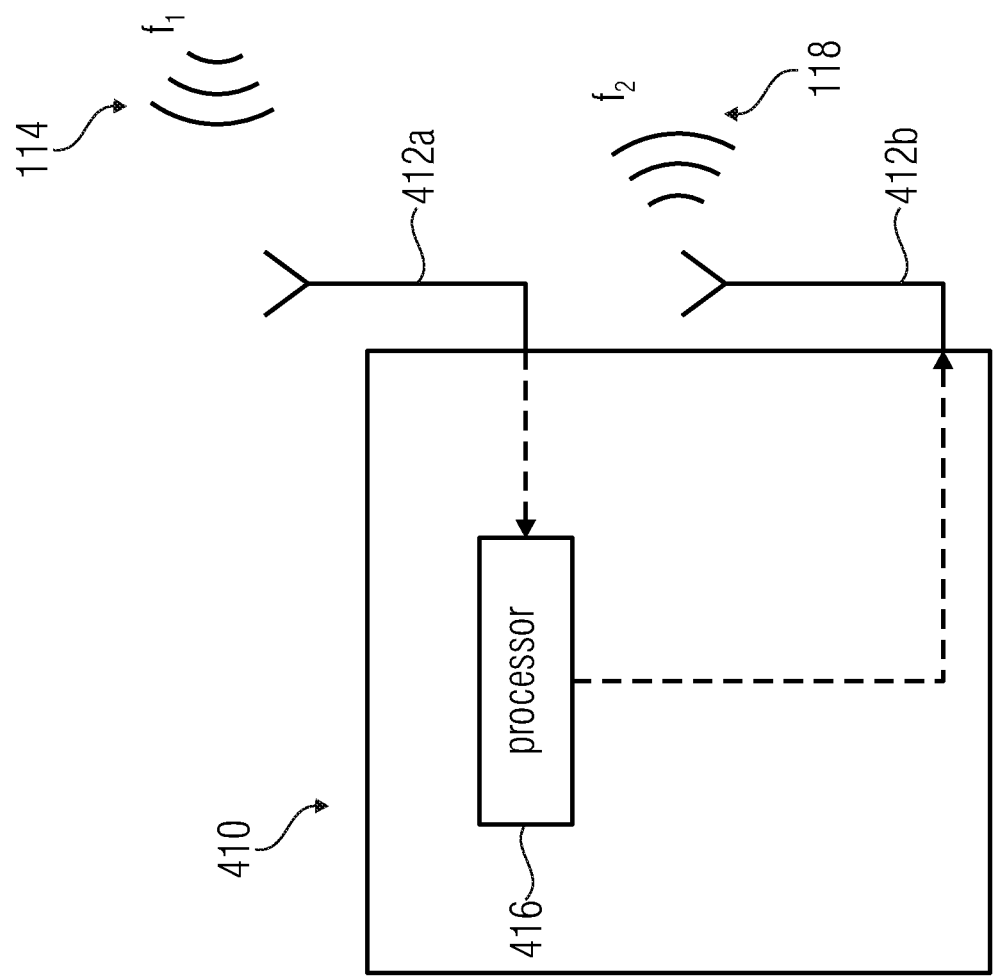
FIG. 14 shows a schematic block diagram of a transmitter according to an embodiment.

FIG. 14 shows a schematic block diagram of a transmitter 410. The transmitter 410 comprises a similar functionality when compared to the receiver 110, for example during an uplink frame or subframe. The receiver 410 comprises the antennas 412a and/or 412b for receiving the first frequency band $f_1$ and for transmitting in the second frequency band $f_2$. The antennas 412a and 412b may correspond to the antennas 112a and 112b. The transmitter 410 comprises the processor 416 which may correspond to the processor 116. The transmitter is configured to receive and process the radio signal 114, and the radio signal comprises the first frequency band $f_1$ including a first signal, the first signal comprising a plurality of TDD-frames. The transmitter may be configured to transmit data in the second frequency band outside of the first frequency band during an uplink-only subframe of a TDD-frame of a plurality of TDD-frames. The transmitter is configured to evaluate reception of downlink data to obtain evaluation data. The transmitter 410 is further configured to transmit the evaluation data in the second frequency band $f_2$ outside of the first frequency band $f_1$. Simplified, TDD-frames may comprise uplink and downlink sequences, wherein, when switching from a downlink sequence (reception of the signal in the first frequency band $f_1$ by the receiver 110) to an uplink sequence (reception of the signal in the first frequency band $f_1$ by the transmitter 410). The same mechanisms may be used to enhance communication between both nodes, the receiver 110 and the transmitter 410.

In accordance with the functionality of the transmitter, a receiver such as the receiver 110 may be configured to receive evaluation data in the second frequency band $f_2$ which is transmitted responsive to a transmission of data in the first frequency band $f_1$ by the receiver. In other words, the NB channel may be used for HARQ from eNB for UE uplink transmissions.

The transmitter 410 may be configured to operate as an eNB which is a 3G base station. The transmitter 410 may be configured to transmit schedule data indicating a schedule of a NB-IoT node such as the NB-IoT node $104_2$ transmitting in the second frequency band such as a sensor, a building or the like. The transmitter 410 may be configured to generate the schedule data so as to schedule the transmission of the NB-IoT node to an uplink subframe of the second signal in the second frequency band $f_2$, wherein the uplink subframe to which the resources are scheduled may be unused for a transmission by the transmitter or a user equipment (receiver 110) communicating with the transmitter 410 in the first frequency band $f_1$. Simplified, the transmitter 410 may organize the schedule of the second frequency band by not scheduling NB-IoT devices on the resources used by the receiver or transmitter for a side-channel communication, for example, for PUCCH. This may allow for a co-existence between the NB-IoT devices and the side-channel communication. The data received by the transmitter 410 may comprise a control data indicating a control of another communication partner or may comprise user data of a receiver as described with reference to the receiver.

FIG. 15 illustrates a schematic diagram of a communications network 500 comprising a receiver, for example, the receiver 110 and comprising a transmitter, for example, the transmitter 410. The receiver 110 transmits, in the second frequency band $f_2$, a radio signal 510, for example, the radio signal 118. The radio signal 510 comprises evaluation data relating to an evaluation of a reception of data received during a TDD-frame of the first signal 114 in the first frequency band $f_1$. The radio signal 510 comprises the second frequency band $f_2$ and is transmitted during a TDD-frame of the radio signal 114.

FIG. 16 illustrates a set of pseudo code which may be used for implementing examples described herein. For example, a separate physical HARQ indicator channel (PHICH) may be implemented or run on a NB download band. This may additionally be signaled in the master information block (MIB) of the LTE protocol. The pseudo code comprises three blocks 610, 620 and 630. Although the last line of the code block 630 indicates that only one channel C1, C2, ..., CN is used, alternatively two or more channels may be assigned, for example, for using frequency diversity. This may be in accordance as done for PUCCH UL transmissions at both sides for the PUSCH. The pseudo code block 610 describes the content of the Master Information Block (MIB).

In block 620 an optional narrowband Physical HARQ Indicator Channel (NB-PHICH) is added as indicated by the code nb-phich-Config    NB-PHICH-Config    OPTIONAL, —Need ON.

Code Block 630 is one possible example which describes the content of the nb-phich-Config

```
NB-PHICH-Config ::= SEQUENCE {
  phich-Duration ENUMERATED {normal, extended},
  phich-Resource ENUMERATED {oneSixth, half, one, two}
  phich-Location ENUMERATED {c1, c2, ..., cN}
}
```

By the above code as an example some parameters of the narrowband PHICH are defined such as the duration, resources to use and the location of the channel. For using, as an non-limiting example only, frequency diversity by utilizing at least two NB-IoT channels, phich-Location may refer to a position of the one or more of the additional frequency bands in the frequency domain, for example, the frequency bands $f_2$, $f_3$, and/or $f_4$ in FIG. 12.

Alternatively, the functionality of the pseudo code may be obtained by similarly configuring the network on a UE basis over RRC.

Figure 17:
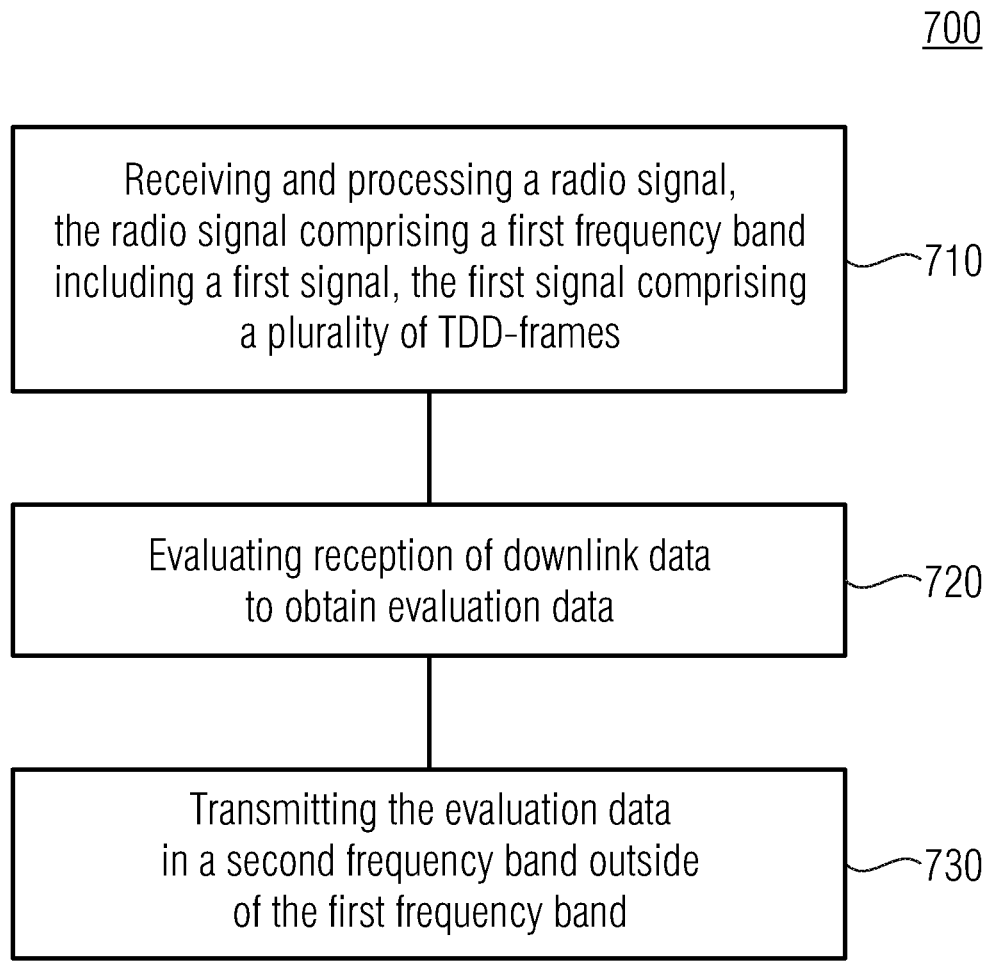
FIG. 17 shows a schematic flow diagram of a method for transmitting evaluation data, according to an embodiment.

FIG. 17 shows a schematic flow diagram of a method 700. The method 700 comprises a step 710 in which a radio signal is received and processed. The radio signal comprises a first frequency band such as the frequency band $f_1$ including a first signal, the first signal comprising a plurality of TDD-frames. A step 720 comprises evaluating reception of downlink data to obtain evaluation data. A step 730 comprises transmitting the evaluation data in a second frequency band outside of the first frequency band. Method 700 may be performed, for example, by the receiver 110.

Figure 18:
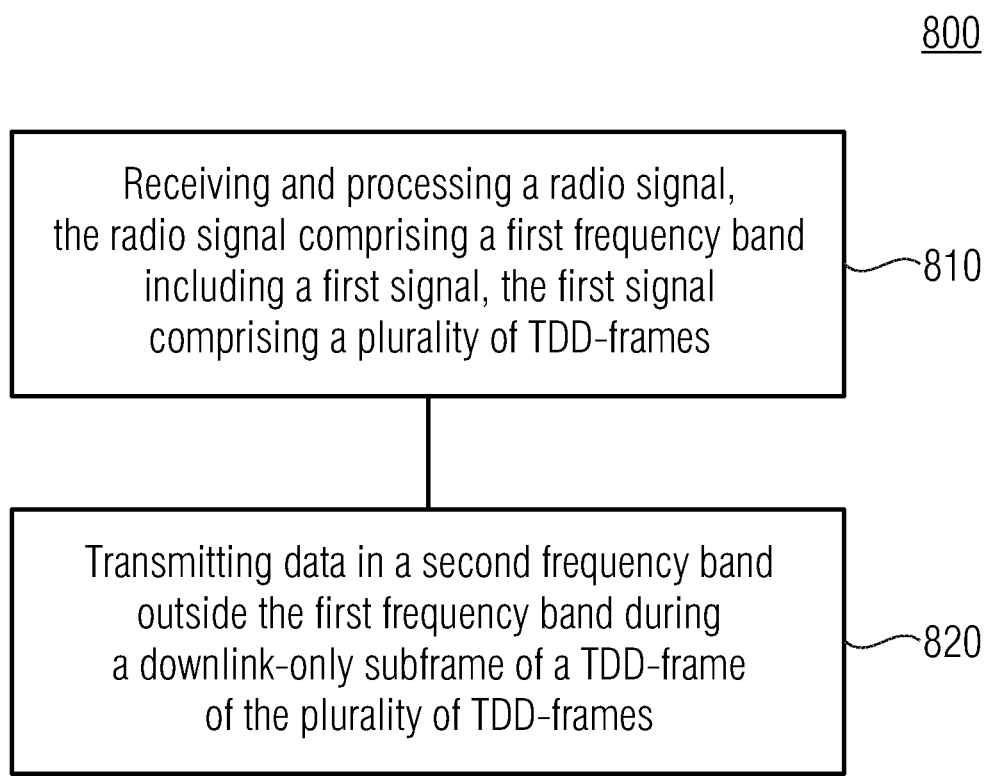
FIG. 18 shows a schematic flowchart of a method for transmitting data, according to an embodiment.

FIG. 18 shows a schematic flowchart of a method 800 which may be performed, for example, by the receiver 110 or by a transmitter. A step 810 comprises receiving and processing a radio signal, the radio signal comprising a first frequency band including a first signal, the first signal comprising a plurality of TDD-frames. A step 820 of method 800 comprises transmitting data in a second frequency band outside of the first frequency band during a downlink-only subframe of a TDD-frame of the plurality of TDD-frames.

Embodiments described herein may be used in mobile communication networks, in particular in enhanced mobile broadband (eMBB) services and ultra-reliable low-latency communication (URLLC).

Although some embodiments have been described in connection with specific LTE-configurations of resource allocations, other configurations are also possible, for example, other uplink/downlink configurations of frames and/or subframes.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A user equipment, UE, wherein the UE comprises an antenna; wherein the UE is configured to receive and process a radio signal with the antenna, the radio signal comprising a first frequency band comprising a first signal, the first signal comprising a plurality of time division duplex, TDD-frames; and wherein the UE is configured to evaluate reception of downlink data contained in the first signal to acquire evaluation data; and wherein the UE is configured to transmit the evaluation data in a second frequency band outside the first frequency band; and at least one of: a) wherein the UE is configured to transmit the evaluation data in at least a first uplink channel in the second frequency band and at least a second uplink channel in a third frequency band, the first uplink channel and the second uplink channel each comprising a bandwidth being narrower when compared to a bandwidth of the first frequency band; b) wherein the UE is configured to transmit control data related to a resource allocation of the first signal to indicate a position of the evaluation data or other data in the second signal in the time domain and/or in the frequency domain or to transmit user data together with the evaluation data; and c) wherein the UE is configured to transmit schedule data indicating a schedule of a NB-IoT node transmitting in the second frequency band, wherein the UE is configured to generate the schedule data so as to schedule the transmission of the NB-IoT node to an uplink subframe of a second signal in the second frequency band, the uplink subframe unused for transmission by the UE or a transmitter communicating with the UE in the first frequency band.

2. The UE of claim 1, wherein each TDD-frame comprises a plurality of subframes, wherein a subframe usable by the UE of the plurality of subframes is an uplink-only subframe or a downlink-only subframe.

3. The UE of claim 1, wherein each TDD-frame comprises a plurality of subframes, wherein the UE is configured to transmit the evaluation data during an downlink subframe in an uplink subframe of an NB-IoT frame.

4. The UE of claim 1, wherein the second frequency band comprises a second signal, the second signal comprising a plurality of TDD-frames.

5. The UE of claim 1, wherein the UE is configured to aggregate the first uplink channel and the second uplink channel by applying a common channel code to the first uplink channel and the second uplink channel.

6. The UE of claim 1, wherein the first uplink channel and the second uplink channel are spaced from each other in the frequency domain.

7. The UE of claim 1, wherein, for acquiring the evaluation data, the UE is configured to determine a prediction value indicating a likelihood of error-free decoding of the downlink data; and to comprise a positive acknowledgement into the evaluation data when the likelihood is above a threshold value and to comprise a negative acknowledgement into the evaluation data when the likelihood is below the threshold value.

8. The UE of claim 7, wherein the UE is configured to transmit the evaluation data before processing of the received download data is completed.

9. The UE of claim 1, wherein the UE is configured to insert a positive acknowledgement indicating an error-free reception of the downlink data into the evaluation data or to insert, into the evaluation data, a negative acknowledgement indicating a request for retransmission of the downlink data.

10. The UE of claim 1, wherein the UE is configured to insert, into the evaluation data, at least one of information indicating an amount of additional redundancy for retransmission;
information indicating one of a frequency, a time, a frame or a slot within a frame for retransmission;
information relating to a channel quality determined by the UE; information related to a code block of the downlink data; and a decoding probability for retransmitted data comprising the additional redundancy.

11. The UE of claim 1, wherein the UE is configured to transmit the evaluation data in response to a reception of a retransmission of the downlink data.

12. The UE of claim 1, wherein each TDD-frame comprises a plurality of subframes, wherein a subframe of the plurality of subframes is an uplink-only subframe or a downlink-only subframe, wherein the UE is configured to comprise information indicating a request for using an uplink-only subframe into the evaluation data.

13. The UE of claim 1, wherein the UE is configured to operate in accordance with the LTE standard, wherein the second frequency band comprises an NB-IoT channel.

14. The UE of claim 1, wherein the UE is configured to receive evaluation data in the second frequency band responsive to a transmission of data in the first frequency band.

15. The UE of claim 1, wherein the first frequency band is used for a first mobile communication standard, wherein the second frequency band is used for a second mobile communication standard.

16. The UE of claim 1, wherein the UE is configured to transmit a control data in the first frequency band, the control data indicating a position of the evaluation data in the second signal in the time domain or in the frequency domain.

17. The UE of claim 1, wherein the UE is configured to receive a control data in the first frequency band, the control data indicating a position of the evaluation data in the second signal in the time domain or in the frequency domain, wherein the UE is configured to transmit the evaluation data at the position in the second signal.

18. The UE of claim 1, wherein the second frequency band is accessed via an FDD-scheme.

19. transmitter, wherein the transmitter comprises an antenna; wherein the transmitter is configured to receive and process a radio signal with the antenna, the radio signal comprising a first frequency band comprising a first signal, the first signal comprising a plurality of time division duplex, TDD-frames; wherein the transmitter is configured to evaluate reception of downlink data contained in the first signal to acquire evaluation data; wherein the transmitter is configured to transmit the evaluation data in a second frequency band outside the first frequency band; wherein the transmitter is configured to receive and process a radio signal, the radio signal comprising a first frequency band comprising a first signal, the first signal comprising a plurality of TDD-frames; wherein the transmitter is configured to transmit data in a second frequency band outside the first frequency band during a downlink-only subframe of a TDD-frame of the plurality of TDD-frames; wherein the data comprises a control data indicating a control of another communication partner or comprises user data of the receiver.

20. The transmitter of claim 19, wherein the transmitter is configured to transmit schedule data indicating a schedule of a NB-IoT node transmitting in the second frequency band, wherein the transmitter is configured to generate the schedule data so as to schedule the transmission of the NB-IoT node to an uplink subframe of a second signal in the second frequency band, the uplink subframe unused for transmission by the transmitter or a user equipment communicating with the transmitter in the first frequency band.

21. A wireless communication system, comprising: a UE wherein the UE comprises an antenna; wherein the UE is configured to receive and process a radio signal with the antenna, the radio signal comprising a first frequency band comprising a first signal, the first signal comprising a plurality of time division duplex, TDD-frames; and wherein the UE is configured to evaluate reception of downlink data contained in the first signal to acquire evaluation data; and wherein the UE is configured to transmit the evaluation data in a second frequency band outside the first frequency band; and at least one of: a) wherein the UE is configured to transmit the evaluation data in at least a first uplink channel in the second frequency band and at least a second uplink channel in a third frequency band, the first uplink channel and the second uplink channel each comprising a bandwidth being narrower when compared to a bandwidth of the first frequency band; b) wherein the UE is configured to transmit control data related to a resource allocation of the first signal to indicate a position of the evaluation data or other data in the second signal in the time domain and/or in the frequency domain or to transmit user data together with the evaluation data; and c) wherein the UE is configured to transmit schedule data indicating a schedule of a NB-IoT node transmitting in the second frequency band, wherein the UE is configured to generate the schedule data so as to schedule the transmission of the NB-IoT node to an uplink subframe of a second signal in the second frequency band, the uplink subframe unused for transmission by the UE or a transmitter communicating with the UE in the first frequency band; and a transmitter comprising an antenna; wherein the transmitter is configured to receive and process a radio signal with the antenna, the radio signal received with the transmitter comprising a first frequency band comprising a first signal, the first signal comprising a plurality of TDD-frames; wherein the transmitter is configured to evaluate reception of downlink data contained in the radio signal received with the transmitter to acquire evaluation data; wherein the transmitter is configured to transmit the evaluation data in a second frequency band outside the first frequency band.

22. A method, comprising: receiving, with an antenna, and processing a radio signal, the radio signal comprising a first frequency band comprising a first signal, the first signal comprising a plurality of time division duplex, TDD-frames; evaluating reception of downlink data contained in the first signal to acquire evaluation data; transmitting the evaluation data in a second frequency band outside the first frequency band; and at least one of: a) transmitting the evaluation data in at least a first uplink channel in the second frequency band and at least a second uplink channel in a third frequency band, the first uplink channel and the second uplink channel each comprising a bandwidth being narrower when compared to a bandwidth of the first frequency band; b) transmitting control data related to a resource allocation of the first signal to indicate a position of the evaluation data or other data in the second signal in the time domain and/or in the frequency domain or to transmit user data together with the evaluation data; and c) transmitting schedule data indicating a schedule of a NB-IoT node transmitting in the second frequency band, generating the schedule data so as to schedule the transmission of the NB-IoT node to an uplink subframe of a second signal in the second frequency band, the uplink subframe unused for transmission by a UE or a transmitter communicating with the UE in the first frequency band.

23. A method, comprising:
receiving, with an antenna, and processing a radio signal, the radio signal comprising a first frequency band comprising a first signal, the first signal comprising a plurality of time division duplex, TDD-frames;
transmitting data in a second frequency band outside the first frequency band during a downlink-only subframe of a TDD-frame of the plurality of TDD-frames in the first frequency band;
receiving and processing a radio signal, the radio signal comprising a first frequency band comprising a first signal, the first signal comprising a plurality of TDD-frames;
transmitting data in a second frequency band outside the first frequency band during a downlink-only subframe of a TDD-frame of the plurality of TDD-frames;
such that the data comprises a control data indicating a control of another communication partner or comprises user data of the receiver.

24. A non-transitory digital storage medium having a computer program stored thereon to perform a method, the method comprising:
receiving, with an antenna, and processing a radio signal, the radio signal comprising a first frequency band comprising a first signal, the first signal comprising a plurality of time division duplex, TDD-frames;
evaluating reception of downlink data contained in the first signal to acquire evaluation data;
transmitting the evaluation data in a second frequency band outside the first frequency band, and at least one of:
a) transmitting the evaluation data in at least a first uplink channel in the second frequency band and at least a second uplink channel in a third frequency band, the first uplink channel and the second uplink channel each comprising a bandwidth being narrower when compared to a bandwidth of the first frequency band;
b) transmitting control data related to a resource allocation of the first signal to indicate a position of the evaluation data or other data in the second signal in the time domain and/or in the frequency domain or to transmit user data together with the evaluation data; and
c) transmitting schedule data indicating a schedule of a NB-IoT node transmitting in the second frequency band, generating the schedule data so as to schedule the transmission of the NB-IoT node to an uplink subframe of a second signal in the second frequency band, the uplink subframe unused for transmission by a UE or a transmitter communicating with the UE in the first frequency band. when said computer program is run by a computer.

25. A non-transitory digital storage medium having a computer program stored thereon to perform a method, the method comprising:
receiving, with an antenna, and processing a radio signal, the radio signal comprising a first frequency band comprising a first signal, the first signal comprising a plurality of time division duplex, TDD-frames;
transmitting data in a second frequency band outside the first frequency band during a downlink-only subframe of a TDD-frame of the plurality of TDD-frames in the first frequency band,
receiving and processing a radio signal, the radio signal comprising a first frequency band comprising a first signal, the first signal comprising a plurality of TDD-frames;
transmitting data in a second frequency band outside the first frequency band during a downlink-only subframe of a TDD-frame of the plurality of TDD-frames;
such that the data comprises a control data indicating a control of another communication partner or comprises user data of the receiver
when said computer program is run by a computer.

* * * * *